US012652695B2

(12) United States Patent
Wu

(10) Patent No.: US 12,652,695 B2
(45) Date of Patent: Jun. 9, 2026

(54) WIRELESS COMMUNICATION METHOD AND APPARATUS, DEVICE, AND STORAGE MEDIUM

(71) Applicant: GUANGDONG OPPO MOBILE TELECOMMUNICATIONS CORP., LTD., Dongguan (CN)

(72) Inventor: Zuomin Wu, Dongguan (CN)

(73) Assignee: GUANGDONG OPPO MOBILE TELECOMMUNICATIONS CORP., LTD., Dongguan (CN)

( * ) Notice: Subject to any disclaimer, the term of this patent is extended or adjusted under 35 U.S.C. 154(b) by 306 days.

(21) Appl. No.: 18/397,402

(22) Filed: Dec. 27, 2023

(65) Prior Publication Data

US 2024/0292450 A1 Aug. 29, 2024

Related U.S. Application Data

(63) Continuation of application No. PCT/CN2021/110638, filed on Aug. 4, 2021.

(51) Int. Cl.
*H04W 72/51* (2023.01)
*H04W 74/00* (2009.01)

(52) U.S. Cl.
CPC ................................. *H04W 74/002* (2013.01)

(58) Field of Classification Search
CPC . H04W 74/006; H04W 74/002; H04W 72/51; H04W 72/542; H04W 72/11
See application file for complete search history.

(56) References Cited

U.S. PATENT DOCUMENTS

2017/0135128 A1 5/2017 Yerramalli et al.
2021/0351888 A1* 11/2021 Park ...................... H04W 72/51
(Continued)

FOREIGN PATENT DOCUMENTS

CN 111970706 A 11/2020
CN 112655271 A 4/2021
(Continued)

OTHER PUBLICATIONS

International Search Report and Written Opinion dated May 7, 2022 in International Application No. PCT/CN2021/110638. English translation attached.
(Continued)

*Primary Examiner* — Anez C Ebrahim
(74) *Attorney, Agent, or Firm* — Sheppard, Mullin, Richter & Hampton LLP

(57) ABSTRACT

The present disclosure relates to communication technology, and discloses a wireless communication method and apparatus, a device, and a storage medium. The method includes: obtaining indication information; and determining whether a transmission of a first channel corresponds to a channel access procedure and/or determining a channel access parameter in a channel access procedure corresponding to the transmission of the first channel according to the indication information. With the solutions of the present disclosure, the terminal device can determine whether a channel access procedure is required during an initial access procedure according to the obtained indication information, so as to determine a DCI size or an RAR type to be demodulated during the initial access procedure, or determine whether to perform the channel access procedure during a PRACH or MsgA transmission process, thereby avoiding ambiguity in understanding between the terminal device and the network device.

11 Claims, 3 Drawing Sheets

(56)                    References Cited

U.S. PATENT DOCUMENTS

2023/0283415 A1*    9/2023   Blankenship ......... H04L 1/1854
                                                                          370/329
2025/0063438 A1*    2/2025   Rastegardoost ...... H04W 36/08

FOREIGN PATENT DOCUMENTS

CN          112997559 A      6/2021
WO          2021031016 A1    2/2021

OTHER PUBLICATIONS

Moderator (Qualcomm Incorporated), "Feature lead summary of
channel access mechanism for 52.6GHz-71GHz band, ver03"3GPP
TSG RAN WG1 Meeting #105-e R1-2106193, May 27, 2021,
Section 2.10.
Extended European search report of counterpart European applica-
tion No. 21952251.3 issued on Jul. 1, 2024.
Communication pursuant to Article 94(3) EPC of European appli-
cation No. 21952251.3 issued on Feb. 27, 2025.

* cited by examiner

Terminal Device 70

Network Device 80

WIRELESS COMMUNICATION METHOD AND APPARATUS, DEVICE, AND STORAGE MEDIUM

CROSS-REFERENCE TO RELATED APPLICATIONS

This application is a continuation of International Application No. PCT/CN2021/110638 filed on Aug. 4, 2021, the entire content of which is incorporated herein by reference.

TECHNICAL FIELD

The present disclosure relates to communication technology, and more particularly, to a wireless communication method and apparatus, a device, and a storage medium.

BACKGROUND

With the evolution of the NR system, researches on the NR system may include new frequency bands such as 52.6 GHz-71 GHz or 71 GHz-114.25 GHz. The new frequency bands may include licensed spectrums or unlicensed spectrums.

For wireless communication on the new frequency bands, how to determine channel access of a terminal device during an initial access procedure of the terminal device needs further study.

SUMMARY

The embodiments of the present disclosure provide a wireless communication method and apparatus, a device, and a storage medium. The technical solutions are as follows.

In an aspect of the embodiments of the present disclosure, a wireless communication method is provided. The method is performed by a terminal device, and the method includes: obtaining indication information; and determining whether a transmission of a first channel corresponds to a channel access procedure and/or determining a channel access parameter in a channel access procedure corresponding to the transmission of the first channel according to the indication information.

In an aspect of the embodiments of the present disclosure, a wireless communication method is provided. The method is performed by a network device, and the method includes: transmitting indication information to a terminal device, the indication information being used for determining whether a transmission of a first channel corresponds to a channel access procedure and/or determining a channel access parameter in a channel access procedure corresponding to the transmission of the first channel.

In an aspect of the embodiments of the present disclosure, a wireless communication apparatus is provided. The apparatus includes: an obtaining module configured to obtain indication information; and a determining module configured to determine whether a transmission of a first channel corresponds to a channel access procedure and/or determine a channel access parameter in a channel access procedure corresponding to the transmission of the first channel according to the indication information.

In an aspect of the embodiments of the present disclosure, a wireless communication apparatus is provided. The apparatus includes: a transmitting module configured to transmit indication information to a terminal device, the indication information being used for determining whether a transmission of a first channel corresponds to a channel access procedure and/or determining a channel access parameter in a channel access procedure corresponding to the transmission of the first channel.

In an aspect of the embodiments of the present disclosure, a terminal device is provided. The terminal device includes a processor and a memory. The memory stores a computer program and the processor is configured to execute the computer program to implement the above method in the terminal device.

In an aspect of the embodiments of the present disclosure, a network device is provided. The network device includes a processor and a memory. The memory stores a computer program and the processor is configured to execute the computer program to implement the above method in the network device.

In an aspect of the embodiments of the present disclosure, a computer-readable storage medium is provided. The computer-readable storage medium has a computer program stored therein. The computer program is configured to be executed by a processor to perform the above method in the terminal device or the above method in the network device.

In an aspect of the embodiments of the present disclosure, a chip is provided. The chip includes a programmable logic circuit and/or program instructions. The chip, when running, is configured to perform the above method in the terminal device or the above method in the network device.

In an aspect of the embodiments of the present disclosure, a computer program product or computer program is provided. The computer program product or computer program includes computer instructions stored in a computer-readable storage medium. A processor reads and executes the computer instructions from the computer-readable storage medium to perform the above method in the terminal device or the above method in the network device.

The technical solutions according to the embodiments of the present disclosure may include the following advantageous effects.

With the solutions of the present disclosure, the terminal device can determine whether a channel access procedure is required during an initial access procedure according to the obtained indication information, so as to determine a Downlink Control Information (DCI) size or a Random Access Response (RAR) type to be demodulated during the initial access procedure, or determine whether to perform the channel access procedure during a Physical Random Access Channel (PRACH) or MsgA transmission process, thereby avoiding ambiguity in understanding between the terminal device and the network device, ensuring completion of the initial access, and facilitating improvement of the access success rate and communication reliability. The present disclosure can also ensure the fairness of spectrum sharing when wireless communication is performed on a carrier on the shared spectrum between communication devices (for example, a network device and a terminal device).

3

Figure 4:
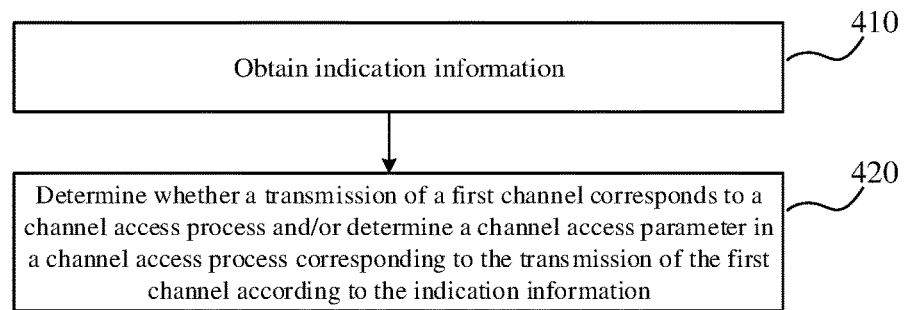
Figure 5:
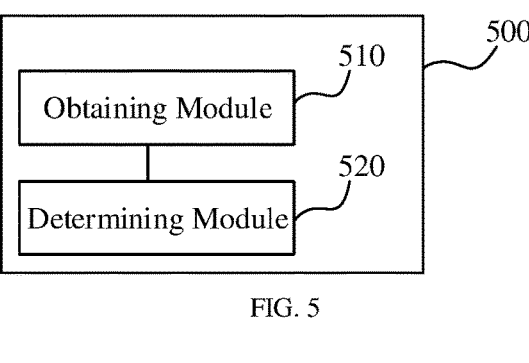
Figure 6:
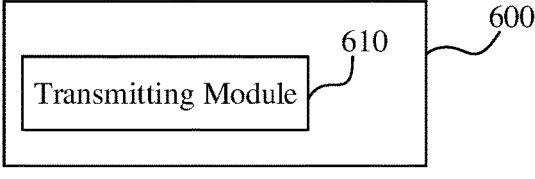
Figure 7:
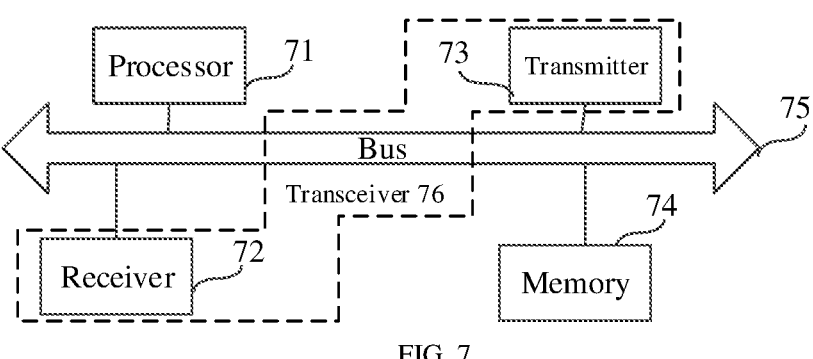
Figure 8:
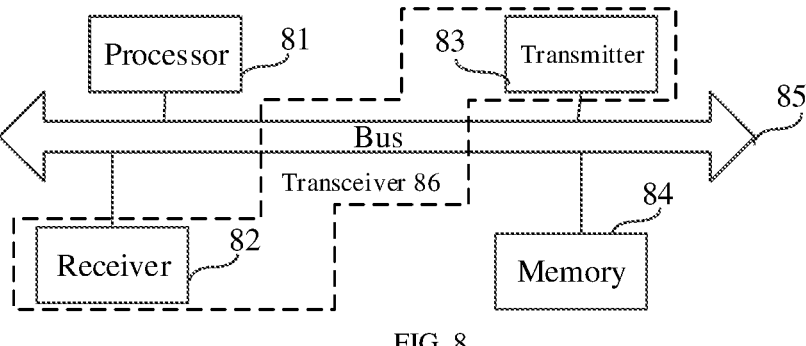

FIG. 4 is a flowchart illustrating a wireless communication method according to an embodiment of the present disclosure;

FIG. 5 is a block diagram of a wireless communication apparatus according to an embodiment of the present disclosure;

FIG. 6 is a block diagram of a wireless communication apparatus according to another embodiment of the present disclosure;

FIG. 7 is a block diagram of a terminal device according to an embodiment of the present disclosure; and FIG. 8 is a block diagram of a network device according to an embodiment of the present disclosure.

DESCRIPTION OF EMBODIMENTS

The embodiments of the present disclosure will be further described in detail below with reference to the accompanying drawings, such that the objects, technical solutions, and advantages of the present disclosure will become more apparent.

The network architecture and service scenario described in the embodiments of the present disclosure are provided for illustrating the technical solutions of the embodiments of the present disclosure more clearly, and do not constitute limitations on the technical solutions according to the embodiments of the present disclosure. With the evolution of the technology and the emergence of new service scenarios, the technical solutions provided in the embodiments of the present disclosure are also applicable to similar technical problems.

The solutions according to the embodiments of the present disclosure can be applied to various communication systems, including for example: Global System of Mobile Communication (GSM), Code Division Multiple Access (CDMA) system, Wideband Code Division Multiple Access (WCDMA) system, General Packet Radio Service (GPRS), Long Term Evolution (LTE) system, Advanced Long Term Evolution (LTE-A) system, New Radio (NR) system, evolved NR system, LTE-based access to unlicensed spectrum (LTE-U) system, NR-based access to unlicensed spectrum (NR-U) system, Non-Terrestrial Network (NTN) system, Universal Mobile Telecommunication System (UMTS), Wireless Local Area Networks (WLAN), Wireless Fidelity (WiFi), the $5^{th}$ Generation (5G) system, or other future evolved communication systems.

Generally, traditional communication systems can support a limited number of connections and are easy to implement. However, with the development of communication technology, mobile communication systems will support not only traditional communication, but also e.g., Device to Device (D2D) communication, Machine to Machine (M2M) communication, and Machine Type Communication (MTC), Vehicle to Vehicle (V2V) communication, Vehicle to everything (V2X) communication, etc. The embodiments of the present disclosure can also be applied to these communication systems.

In some embodiments, the communication system of an embodiment of the present disclosure may be applied to a Carrier Aggregation (CA) scenario, a Dual Connectivity (DC) scenario, a Standalone (SA) network deployment scenario, and the like.

In some embodiments, the communication system of an embodiment of the present disclosure may be applied to unlicensed spectrum or shared spectrum. Alternatively, the communication system of an embodiment of the present disclosure may be applied to licensed spectrum or non-shared spectrum.

The embodiments of the present disclosure may be applied to a Non-Terrestrial Network (NTN) system or a Terrestrial Network (TN) system.

Figure 1:
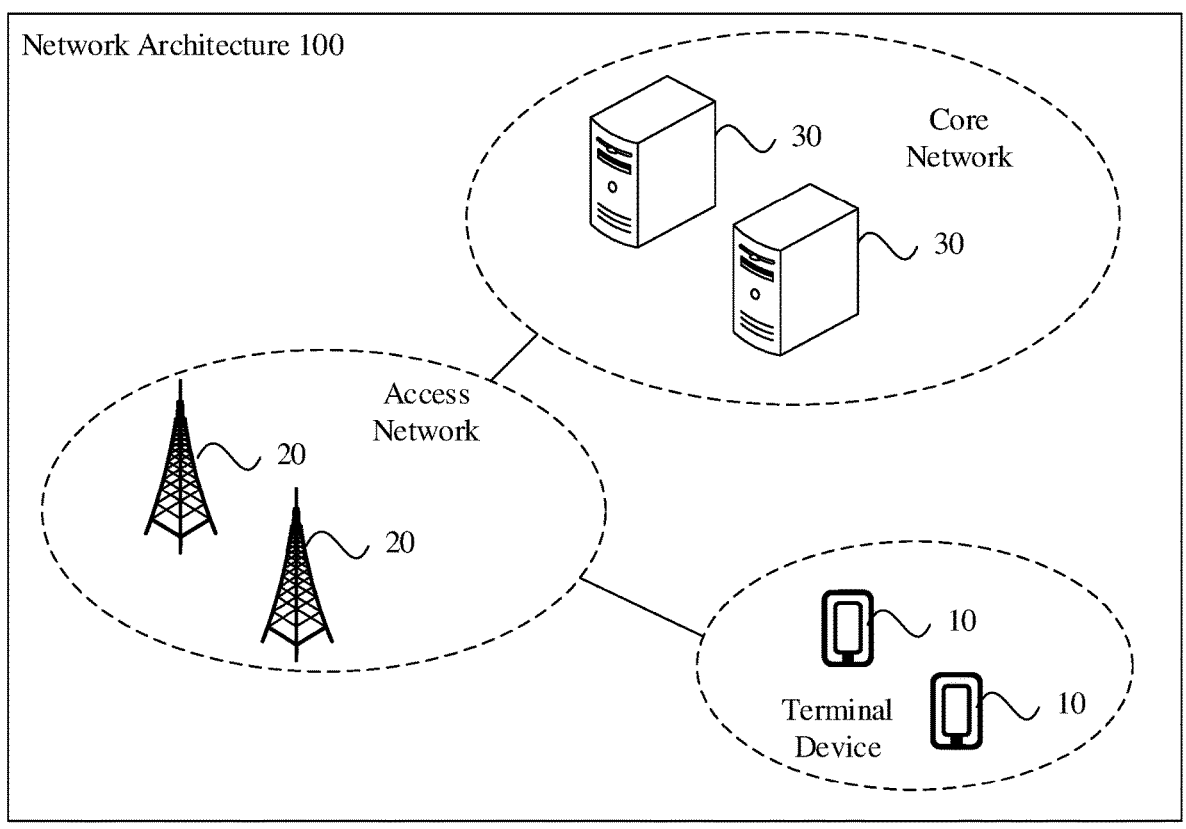
FIG. 1 is a schematic diagram showing a network architecture according to an embodiment of the present disclosure.

FIG. 1 is a schematic diagram showing a network architecture 100 according to an embodiment of the present disclosure. The network architecture 100 may include: a terminal device 10, an access network device 20, and a core network device 30.

The terminal device 10 may refer to a User Equipment (UE), an access terminal, a subscriber unit, a subscriber station, a mobile station, a mobile, a remote station, a remote terminal, a mobile device, a wireless communication device, a user agent, or a user device. In some embodiments, the terminal device 10 can also be a cellular phone, a cordless phone, a Session Initiation Protocol (SIP) phone, a Wireless Local Loop (WLL) station, a Personal Digital Assistant (PDA), a handheld device with a wireless communication function, a computing device or another processing device connected to a wireless modem, a vehicle-mounted device, a wearable device, a terminal device in the $5^{th}$ Generation System (5GS) or a terminal device in a future evolved Public Land Mobile Network (PLMN), etc. The embodiment of the present disclosure is not limited to any of these examples. For convenience of description, the devices mentioned above are collectively referred to as terminal devices. There may be generally a plurality of terminal devices 10, and one or more terminal devices 10 may be distributed in a cell managed by each access network device 20.

The access network device 20 is a device deployed in an access network to provide a wireless communication function for the terminal device 10. The access network device 20 may include various forms of macro base stations, micro base stations, relay stations, access points, and so on. In systems using different wireless access technologies, the name of the device with the functions of the access network device may be different. For example, in a 5G NR system, it is referred to as gNodeB or gNB. With the evolution of communication technology, the name "access network device" may change. For the convenience of description, in the embodiment of the present disclosure, the above devices that provide the wireless communication function for the terminal device 10 are collectively referred to as access network devices. In some embodiments, a communication relationship may be established between the terminal device 10 and the core network device 30 via the access network device 20. Exemplarily, in a Long Term Evolution (LTE) system, the access network device 20 may be an Evolved Universal Terrestrial Radio Access Network (EUTRAN) or one or more eNodeBs in the EUTRAN. In the 5G NR system, the access network device 20 may be a Radio Access Network (RAN) or one or more gNBs in the RAN. In the embodiment of the present disclosure, unless otherwise specified, the "network device" refers to an access network device 20, such as a base station.

The core network device 30 is a device deployed in the core network. The functions of the core network device 30 are mainly to provide user connections, manage users, carry services, and provide interfaces to external networks as a bearer network. For example, the core network device in the 5G NR system can include devices such as an Access and Mobility Management Function (AMF) entity, a User Plane Function (UPF) entity, and a Session Management Function (SMF) entity.

In some embodiments, the access network device 20 and the core network device 30 communicate with each other via a certain air interface technology, such as an NG interface in a 5G NR system. The access network device 20 and the terminal device 10 communicate with each other via a certain air interface technology, such as a Uu interface.

The "5G NR system" in the embodiment of the present disclosure may also be referred to as a 5G system or an NR system, but those skilled in the art can understand its meaning. The technical solutions described in the embodiments of the present disclosure can be applied to the LTE system, the 5G NR system, and a subsequent evolved system of the 5G NR system, and can also be applied to systems such as Narrow Band Internet of Things (NB-IoT) systems and other communication systems, and the present disclosure is not limited to any of these examples.

In the embodiment of the present disclosure, the network device may provide services for a cell, and the terminal device may communicate with the network device over transmission resources, e.g., frequency domain resources or frequency spectral resources, on carriers used in the cell. The cell may be a cell corresponding to the network device (e.g., base station). The cell may belong to a macro base station or a base station corresponding to a small cell. The small cell here may include a metro cell, a micro cell, a pico cell, a femto cell, or the like. These small cells have characteristics such as small coverage and low transmission power, and are suitable for providing high-rate data transmission services.

Before introducing the technical solutions of the present disclosure, some background technical knowledge involved in the present disclosure will be introduced. The following related technologies may be in some embodiments combined with the technical solutions of the embodiments of the present disclosure as some solutions, and all of them belong to the protection scope of the embodiments of the present disclosure. The embodiments of the present disclosure include at least part of the following content.

1. High-Frequency Related Background

With the evolution of the NR system, researches on the NR system may include new frequency bands such as 52.6 GHz to 71 GHz or 71 GHz to 114.25 GHz. The new frequency bands may include licensed spectrums or unlicensed spectrums. In other words, the new frequency bands include dedicated spectrums and shared spectrums.

The unlicensed spectrums are spectrums allocated by a country or a region that can be used for radio device communication. These spectrums are usually considered as shared spectrums, that is, communication devices in different communication systems can use these spectrums without applying for a dedicated spectrum authorization from the government, as long as they meet the regulatory requirements set by the country or region on the spectrums.

In order to allow various communication systems that use the unlicensed spectrums for wireless communication to coexist friendly on the spectrums, some countries or regions have stipulated regulatory requirements that must be met when using the unlicensed spectrums. For example, the communication device follows a Listen Before Talk (LBT) principle, or in other words, the communication device needs to perform a channel access procedure. That is, before a communication device transmits a signal on an unlicensed spectrum channel, it needs to perform channel sensing. Only when the channel sensing is successful, can the communication device transmit the signal. If the communication device fails in channel sensing on the unlicensed spectrum channel, the communication device cannot transmit signals.

Channel sensing success (also known as LBT success or channel sensing idle), for example, refers to the energy detected on the channel in the sensing time slot is lower than the energy detection threshold.

Channel sensing failure (also known as LBT failure or channel sensing busy), for example, refers to the energy detected on the channel in the sensing time slot is higher than or equal to the energy detection threshold.

The subcarrier spacing considered in the new frequency band may be larger than the subcarrier spacing supported by the existing NR system. The current candidate subcarrier spacings include at least one of: 120 kHz, 240 KHz, 480 kHz, or 960 KHz.

2. Downlink Access Procedure in NR System

In the NR system, the terminal device detects a Synchronization Signal and PBCH block (SSB) on a sync raster. After detecting the SSB, the terminal device detects a System Information Block 1 (SIB1, or Remaining Minimum System Information (RMSI)) according to configuration information in Physical Broadcast Channel (PBCH) and detects other system messages based on the received SIB1. Here, the terminal device receives the SIB1 message and other system messages according to DCI format 1_0 scrambled with a System Information-Radio Network Temporary Identifier (SI-RNTI).

It should be understood that the size of DCI format 1_0 is fixed. Here, in the network deployment scenarios of shared spectrums and non-shared spectrums, the sizes of DCI format 1_0 are different. If the NR system network is deployed in a shared spectrum scenario, the DCI format 1_0 includes channel access parameter indication information (ChannelAccess-CPext). If the NR system network is not deployed in a shared spectrum scenario, the DCI format 1_0 does not include the channel access parameter indication information. Here, the channel access parameter indication information indicates a related parameter for a communication device, such as a terminal device, in a channel access procedure.

After receiving the system message, the terminal device can initiate a random access procedure according to the random access related configuration information in the system message.

3. Four-Step Random Access Procedure in NR System

Figure 2:
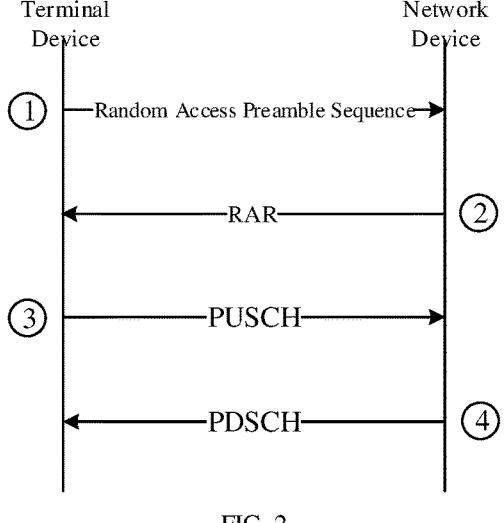
FIG. 2 is a schematic diagram showing a four-step random access procedure according to an embodiment of the present disclosure.

In the NR system, the four-step random access procedure is also referred to as Type-1 random access procedure. As shown in FIG. 2, the four-step random access procedure includes the following steps.

Step 1: A terminal device transmits a random access preamble, or a message (Msg1), to a base station.

Step 2: The terminal device detects a Random Access Response (RAR), or message (Msg2), transmitted by the base station.

> If the terminal device detects the RAR corresponding to the Msg1 in an RAR window, the terminal device transmits a message (Msg3) according to the RAR.
>
> The RAR is associated with a Random Access Preamble IDentifier (RAPID).
>
> The RAR includes the following information: Random Access Preamble ID, Timing Advance Command (TAC), Temporary Cell-Radio Network Temporary Identifier (TC-RNTI), and Uplink grant (UL grant, also known as RAR UL grant).
>
> Here, the RAR UL grant includes the following information: Frequency hopping flag, Physical Uplink Shared Channel (PUSCH) frequency resource allocation, PUSCH time resource allocation, Modulation and Coding Scheme (MCS), Transmit Power Control (TPC) command for PUSCH, and Channel State Information (CSI) request.

Here, for a shared spectrum, the RAR UL grant further includes the following information: channel access parameter indication (ChannelAccess-CPext);

If the terminal device does not detect the RAR corresponding to the Msg1 within the RAR window, the terminal device will re-initiate the random access procedure (for example, the terminal device retransmits the Msg1).

Step 3: The terminal device transmits a PUSCH (or Msg3 PUSCH) to the base station according to the received RAR.

The Redundancy Version (RV) number used for the Msg3 PUSCH transmitted according to the uplink grant in the RAR is 0.

This step allows Hybrid Automatic Repeat reQuest (HARQ) retransmission, that is, after transmitting a PUSCH to the base station according to the RAR, the terminal device may receive a DCI format 0_0 scrambled with a TC-RNTI for scheduling the retransmission of the PUSCH.

The DCI format 0_0 scrambled with the TC-RNTI includes at least some of the following information: uplink and downlink DCI indication, frequency resource allocation (with a size determined according to a bandwidth of a UL Bandwidth Part (BWP)), time resource allocation, frequency domain frequency hopping indication, MCS, new data indication, RV, HARQ process number, PUSCH power control command word, and UL/Supplementary Uplink (SUL) carrier indication.

Here, for a shared spectrum, the DCI format 0_0 further includes the following information: channel access parameter indication.

Step 4: The terminal device receives a Physical Downlink Shared Channel (PDSCH), or message (Msg4), including a contention resolution message, transmitted by the base station.

The PDSCH including the contention resolution message transmitted by the base station is received according to a DCI format 1_0 scrambled with a TC-RNTI or Cell-Radio Network Temporary Identifier (C-RNTI).

This step allows HARQ retransmission. That is, after receiving the DCI format 1_0 scrambled with the TC-RNTI or C-RNTI, if the terminal device fails to receive the corresponding PDSCH, the terminal device will feed back Negative Acknowledgment (NACK) information over a Physical Uplink Control Channel (PUCCH) resource indicated by the DCI format 1_0.

The DCI format 1_0 scrambled with the TC-RNTI or C-RNTI includes at least some of the following information: uplink and downlink DCI indication, frequency resource allocation (with a size determined according to a DL BWP bandwidth), time resource allocation, Virtual Resource Block (VRB) to Physical Resource Block (PRB) mapping, MCS, new data indication, RV, HARQ process number, Downlink Assignment Index (DAI), PUCCH power control command word, PUCCH resource indication, and PDSCH-to-HARQ feedback time indication.

Here, for a shared spectrum, the DCI format 1_0 further includes the following information: channel access parameter indication;

After receiving the DCI format 1_0 scrambled with the TC-RNTI or C-RNTI, if the terminal device successfully receives the corresponding PDSCH, the random access procedure is completed.

4. Two-Step Random Access Procedure in NR System

Figure 3:
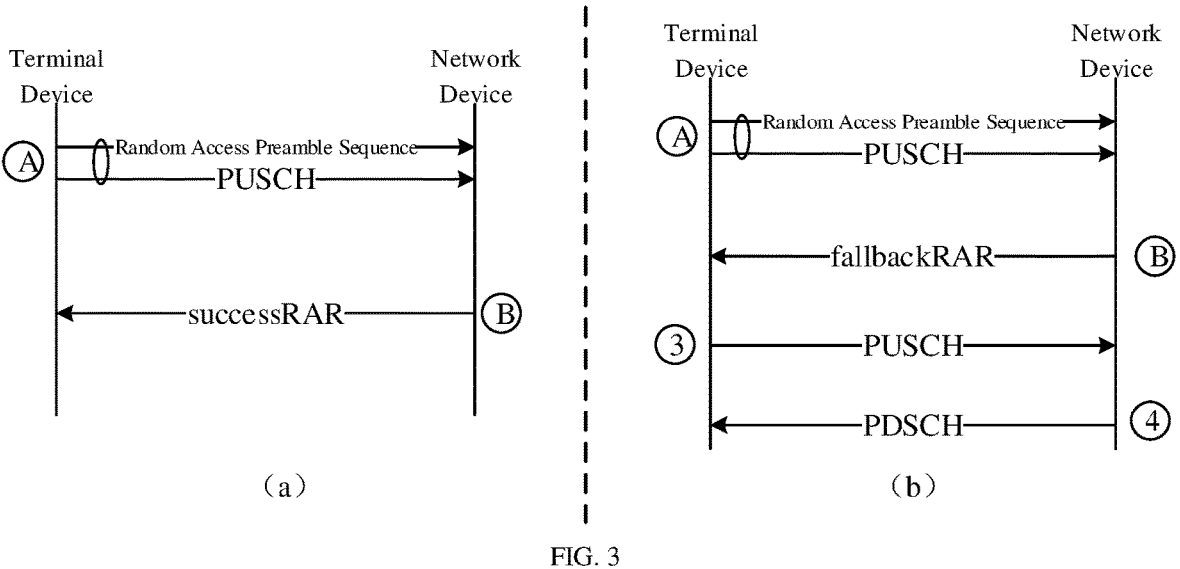
FIG. 3 is a schematic diagram showing a two-step random access procedure according to an embodiment of the present disclosure.

In the NR system, the two-step random access procedure is also referred to as Type-2 random access procedure. As shown in FIG. 3, the two-step random access procedure includes the following steps.

Step 1: A terminal device transmits a random access preamble and a PUSCH (or referred to as message MsgA, that is, MsgA includes a PRACH and a PUSCH) to a base station.

Step 2: The terminal device detects a random access response, or message MsgB, transmitted by the base station. Here, the MsgB includes two types of RARs, one is successRAR (successful random access response), and the other is fallbackRAR (fallback random access response).

Case 1: If the terminal device detects a successRAR corresponding to the MsgA in an RAR window, since the successRAR contains a contention resolution message, the terminal device transmits Acknowledgment (ACK) information to the base station, and the random access procedure is completed (as shown in the left part of FIG. 3).

The successRAR includes the following information: UE Contention Resolution Identity, Transmission Power Control (TPC) Command, HARQ Feedback Timing Indicator, PUCCH Resource Indicator, Timing Advance Command (TAC), and C-RNTI.

Here, for a shared spectrum, the successRAR further includes the following information: channel access parameter indication (ChannelAccess-CPext).

Case 2: If the terminal device detects a fallbackRAR corresponding to the MsgA random access preamble in the RAR window, the terminal device transmits a Msg3 according to the fallbackRAR, or in other words, the terminal device falls back to the four-step random access procedure (where the third and fourth steps are the same as the third and fourth steps in the four-step random access procedure, respectively, as shown in the right part of FIG. 3).

The fallbackRAR is associated with a Random Access Preamble IDentifier (RAPID).

The fallbackRAR includes the following information: Timing Advance Command (TAC), TC-RNTI, and uplink grant (UL grant, also known as RAR UL grant).

Here, the RAR UL grant includes the following information: frequency hopping flag, PUSCH frequency resource allocation, PUSCH time resource allocation, Modulation and Coding Scheme (MCS), TPC command for PUSCH, and CSI request.

Here, for a shared spectrum, the RAR UL grant further includes the following information: channel access parameter indication (ChannelAccess-CPext).

If the terminal device does not detect successRAR or fallbackRAR within the RAR window, the terminal device will re-initiate the two-step or four-step random access procedure (for example, the terminal device retransmits the MsgA or Msg1).

5. Channel Access in Unlicensed Spectrums

The new frequency bands applied in the NR system include both dedicated spectrums (such as licensed spectrums) and shared spectrums (such as unlicensed spectrums). In addition, for the same spectrum, some countries or regions may have LBT (or channel access procedure) requirements, while other countries or regions do not.

For countries and regions that have LBT requirements, the LBT scheme (that is, the channel access scheme) can include omnidirectional LBT, directional LBT, receiver assisted LBT and no LBT. Here, for the channel access scheme without LBT, it may need to be limited by certain conditions, such as a limited duty cycle, a limited transmit power, or limited Maximum Channel Occupancy Time (MCOT), or may apply some interference cancellation mechanisms such as Automatic Transfer Power Control (ATPC), Dynamic Frequency Selection (DFS), long-term interference detection, etc. In addition, it is also possible to switch between channel access with LBT and channel access without LBT.

For countries and regions without LBT requirements, it is also necessary to consider whether to introduce certain conditions such as a limited duty cycle, a limited transmit power, or limited MCOT, or to apply some interference cancellation mechanisms such as ATPC, DFS, long-term interference detection, etc.

On the new frequency bands, for countries or regions with channel access requirements, terminal devices may need to be notified of related parameters in the channel access procedure, such as channel access parameter indication information. For countries or regions without channel access requirements, the terminal device does not need to be notified of related parameters in the channel access procedure, for example, does not need to be notified of channel access parameter indication information. However, whether the related parameters in the channel access procedure are notified will affect the initial access behaviors of the terminal devices. Therefore, how to determine the channel access of the terminal device during the initial access procedure of the terminal device is a problem to be considered in the present disclosure.

With the solutions of the present disclosure, the terminal device can determine whether a channel access procedure is required during an initial access procedure according to the obtained indication information, so as to determine a DCI size or an RAR type to be demodulated during the initial access procedure, or determine whether to perform the channel access procedure during a PRACH or MsgA transmission process, thereby avoiding ambiguity in understanding between the terminal device and the network device, ensuring completion of the initial access, and facilitating improvement of the access success rate and communication reliability. The present disclosure can also ensure the fairness of spectrum sharing when wireless communication is performed on a carrier on the shared spectrum between communication devices (for example, a network device and a terminal device).

Reference is made to FIG. 4, which is a flowchart illustrating a wireless communication method according to an embodiment of the present disclosure. The method can be performed by a terminal device. The method may include at least one of the following operations (410~420):

At operation 410, instruction information is obtained.

In some embodiments, the indication information may be configured by a network device. For example, the terminal device may receive the indication information transmitted by the network device. In another example, the terminal device receives indication information transmitted by another terminal device, and the indication information may be obtained by the other terminal device from a network device.

In some embodiments, the indication information may be configured by another terminal device. For example, the terminal device may receive the indication information transmitted by the other terminal device, and the indication information may be configured by the other terminal device.

At operation 420, it is determined whether a transmission of a first channel corresponds to a channel access procedure and/or a channel access parameter in a channel access procedure corresponding to the transmission of the first channel is determined according to the indication information.

In some embodiments, the first channel may be a channel to be transmitted on a first cell or a first carrier. Here, the first cell corresponds to the first carrier, and the first carrier is a carrier on a shared spectrum.

In some embodiments, the operation 420 may include at least one of the following 1-3:

1. It may be determined whether the transmission of the first channel corresponds to the channel access procedure according to the indication information.

That is, the indication information may indicate whether the transmission of the first channel corresponds to the channel access procedure. For example, the indication information may explicitly or implicitly indicate that the transmission of the first channel corresponds to or does not correspond to the channel access procedure. In some embodiments, the indication information may directly or indirectly indicate that the transmission of the first channel corresponds to or does not correspond to the channel access procedure.

In some embodiments, the transmission of the first channel corresponding to the channel access procedure means that the channel access procedure needs to be performed before the transmission of the first channel. The transmission of the first channel not corresponding to the channel access procedure means that the channel access procedure does not need to be performed before the transmission of the first channel. It should be understood that in all embodiments of the present disclosure, if the indication information indicates that the channel access procedure needs to be performed before the transmission of the first channel, the terminal device performs the channel access procedure before the transmission of the first channel. If the indication information indicates that the channel access procedure does not need to be performed before the transmission of the first channel, the terminal device does not perform the channel access procedure before the transmission of the first channel.

In some embodiments, the phrase "corresponding to the channel access procedure" means that there is LBT (or that LBT needs to be performed, or that LBT is performed), and the phrase "not corresponding to the channel access procedure" means that there is no LBT (or that LBT does not need to be performed, or that LBT is not performed).

2. It may be determined whether channel access parameter indication information is included in grant information for scheduling the transmission of the first channel according to the indication information.

That is, the indication information may indicate whether the grant information for scheduling the transmission of the first channel includes the channel access parameter indication information. For example, the indication information may explicitly or implicitly indicate that the grant information for scheduling the transmission of the first channel includes or does not include the channel access parameter indication information. In some embodiments, the indication information may directly or indirectly indicate that the grant information for scheduling the transmission of the first channel includes or does not include the channel access parameter indication information. Here, for different first channels, the grant information for scheduling the transmissions of the first channels may be different, and for the description of the first channel and the grant information, reference can be made to the following embodiments.

In some embodiments, the channel access parameter indication information may indicate a related parameter of a communication device (such as a terminal device) during the channel access procedure.

In some embodiments, the channel access parameter indication information may indicate at least one of: a type of a channel access scheme, whether to perform a channel access procedure, whether it corresponds to a CP extension, or a length of the CP extension.

In some embodiments, the length of the CP extension refers to a length of a CP of a first symbol in the first channel that is transmitted before the first symbol.

In some embodiments, the channel access parameter indication information may include 1 bit or 2 bits.

In some embodiments, the type of the channel access scheme may include at least one of: omnidirectional LBT, directional LBT, receiver assisted LBT, or no LBT.

In some embodiments, the channel access parameter indication information indicating whether to perform the channel access procedure may include: the channel access parameter indication information indicating whether a duty cycle condition is satisfied. For example, when the duty cycle condition is satisfied, it does not correspond to the channel access procedure; or when the duty cycle condition is not satisfied, it corresponds to the channel access procedure.

3. It may be determined whether the transmission of the first channel corresponds to a Cyclic Prefix (CP) extension according to the indication information.

That is, the indication information may indicate whether the transmission of the first channel corresponds to the CP extension. For example, the indication information may explicitly or implicitly indicate that the transmission of the first channel corresponds to or does not correspond to the CP extension. In some embodiments, the indication information may directly or indirectly indicate that the transmission of the first channel corresponds to or does not correspond to the CP extension.

In some embodiments, a length of the CP extension may be predefined when it is determined according to the indication information that the transmission of the first channel corresponds to the CP extension.

In some embodiments, the length of CP extension may be 0 when it is determined according to the indication information that the transmission of the first channel does not correspond to the CP extension.

In some embodiments, when it is determined according to the indication information that the transmission of the first channel corresponds to the CP extension, the grant information for scheduling the transmission of the first channel includes the channel access parameter indication information; and/or when it is determined according to the indication information that the transmission of the first channel does not correspond to the CP extension, the grant information for scheduling the transmission of the first channel does not include the channel access parameter indication information. Further in some embodiments, the channel access parameter indication information may indicate the length of the CP extension.

In some embodiments, when it is determined according to the indication information that the transmission of the first channel corresponds to the channel access procedure, the grant information for scheduling the transmission of the first channel includes the channel access parameter indication information; or when it is determined according to the indication information that the transmission of the first channel does not correspond to the channel access procedure, the grant information for scheduling the transmission of the first channel does not include the channel access parameter indication information.

In some embodiments, when it is determined according to the indication information that the transmission of the first channel corresponds to a channel access procedure, channel access parameters in the channel access procedure are predefined. In some embodiments, the channel access parameters in the channel access procedure include at least one of: a type of channel access scheme, or a length of CP extension.

In some embodiments, when it is determined according to the indication information that the transmission of the first channel corresponds to the channel access procedure, the terminal device performs the channel access procedure before the transmission of the first channel; and/or when it is determined according to the indication information that the transmission of the first channel does not correspond to the channel access procedure, the terminal device does not perform the channel access procedure before the transmission of the first channel.

With the solutions of the present disclosure, the terminal device can determine whether a channel access procedure is required during an initial access procedure according to the obtained indication information, so as to determine a DCI size or an RAR type to be demodulated during the initial access procedure, or determine whether to perform the channel access procedure during a PRACH or MsgA transmission process, thereby avoiding ambiguity in understanding between the terminal device and the network device, ensuring completion of the initial access, and facilitating improvement of the access success rate and communication reliability. The present disclosure can also ensure the fairness of spectrum sharing when wireless communication is performed on a carrier on the shared spectrum between communication devices (for example, a network device and a terminal device).

In some embodiments, the first channel may include at least one of:

a PUSCH scheduled by a DCI format 0_1, in which case the first channel is the PUSCH, and the grant information for scheduling the transmission of the first channel is DCI corresponding to the DCI format 0_1;

a PUSCH scheduled by DCI format 0_2, in which case the first channel is the PUSCH, and the grant information for scheduling the transmission of the first channel is DCI corresponding to the DCI format 0_2;

a PUCCH corresponding to a PDSCH scheduled by a DCI format 1_1, in which case the first channel is the PUCCH, and the grant information for scheduling the transmission of the first channel is DCI corresponding to the DCI format 1_1;

a PUCCH corresponding to a PDSCH scheduled by a DCI format 1_2, in which case the first channel is the PUCCH, and the grant information for scheduling the transmission of the first channel is DCI corresponding to the DCI format 1_2;

a sidelink scheduled in a Sidelink Control Information (SCI) format, in which case the first channel is the sidelink, and the grant information for scheduling the transmission of the first channel is SCI corresponding to the SCI format, e.g., SCI format 2-A or SCI format 2-B, etc.; or a feedback link corresponding to a sidelink scheduled by an SCI format, in which case the first channel is the feedback link, and the grant information for scheduling the transmission of the first channel is SCI corresponding to the SCI format.

In some embodiments, the first channel may include at least one of:

a PUSCH scheduled by an RAR uplink grant (the RAR is an RAR in the four-step random access procedure), in which case the first channel is the PUSCH, and the grant information for scheduling the transmission of the first channel is the RAR uplink grant;

a PUSCH scheduled by a fallback Random Access Response (fallbackRAR) uplink grant (the fallback-RAR is an RAR in the two-step random access procedure), in which case the first channel is the PUSCH, and the grant information for scheduling the transmission of the first channel is the fallbackRAR uplink grant;

a PUCCH corresponding to a successful Random Access Response (successRAR) (the successRAR is an RAR in the two-step random access procedure), in which case the first channel is the PUCCH, and the grant information for scheduling the transmission of the first channel is the successRAR; or a PUSCH scheduled by a DCI format 0_0, in which case the first channel is the PUSCH, and the grant information for scheduling transmission of the first channel is DCI corresponding to DCI format 0_0.

In some embodiments, the first channel may include at least one of: a PRACH or a message (MsgA), the MsgA including a PRACH and a MsgA PUSCH. The MsgA is a MsgA in the two-step random access procedure.

In some embodiments, the first channel may include a PUCCH corresponding to a PDSCH scheduled by a DCI format 1_0. Here, the first channel is the PUCCH, and the grant information for scheduling the transmission of the first channel is DCI corresponding to the DCI format 1_0.

In some embodiments, the DCI format 1_0 may be a DCI format scrambled with an SI-RNTI, TC-RNTI, C-RNTI, Modulation and Coding Scheme-Cell-Radio Network Temporary Identifier (MCS-C-RNTI), or Configured Scheduling-Radio Network Temporary Identifier (CS-RNTI).

In some embodiments, the DCI format 0_0 may be a DCI format scrambled with a TC-RNTI, C-RNTI, MCS-C-RNTI, or CS-RNTI.

Some exemplary embodiments of the first channel have been given above, but the present disclosure is not limited to any of these examples, and the first channel may be another channel or information.

In some embodiments, the indication information may be carried in a PBCH or a Master Information Block (MIB).

In some embodiments, the indication information may be obtained according to a Global Synchronization Channel Number (GSCN). Exemplarily, the indication information may be determined according to a GSCN set to which the GSCN belongs. For example, the terminal device obtaining the indication information may include: obtaining the indication information according to at least two GSCN sets. The at least two GSCN sets include a first GSCN set and a second GSCN set. The first GSCN set is associated with not corresponding to the channel access procedure, and the second GSCN set is associated with corresponding to the channel access procedure. The terminal device determines that the transmission of the first channel does not correspond to the channel access procedure when the terminal device detects an SSB on a GSCN in the first GSCN set; and/or determines that the first channel corresponds to the channel access procedure when the terminal device detects an SSB on a GSCN in the second GSCN set.

In some embodiments, the indication information may be carried in at least one of: a system message, random access related configuration information (such as rach-ConfigCommon or msgA-ConfigCommon), a handover command, a cell common Radio Resource Control (RRC) message. In some embodiments, the system message may be SIB1 (that is, the indication information may be carried in the SIB1), or the system message may be another SIB different from SIB1 (that is, the indication information may be carried in the other SIB different from SIB1). In some embodiments, the random access related configuration information may be random access related configuration information in a system message, a random access related configuration information in an RRC message, or random access related configuration information in a handover command.

In some embodiments, the indication information may be carried in at least one of: a terminal device dedicated RRC message, a Media Access Control Control Element (MAC CE), or group common DCI.

Some exemplary embodiments for obtaining the indication information have been given above, but the present disclosure is not limited to any of these examples, and the indication information may be obtained in other ways.

In some embodiments, the terminal device may determine whether to enable short control information transmission according to the indication information. That is, the indication information may indicate whether to enable the short control information transmission. For example, the indication information may explicitly or implicitly indicate whether to enable the short control information transmission or not. Alternatively, the indication information may directly or indirectly indicate whether to enable the short control information transmission or not. For example, the indication information may indicate to enable the short control information transmission (that is, the short control information transmission can be used), or not to enable the short control information transmission (that is, the short control information transmission cannot be used). In another example, the indication information may indicate that the short control information transmission condition is satisfied (that is, the short control information transmission can be used, for example, a duty cycle condition corresponding to the short control information transmission is satisfied), or the short control information transmission condition is not satisfied (that is, the short control information transmission cannot be used, for example, a duty cycle condition corresponding to short control information transmission is not satisfied).

In some embodiments, the short control information transmission being enabled may mean that the transmission of the first channel can be performed without performing an LBT procedure, or the transmission of the first channel does not correspond to the channel access procedure. The short control information transmission not being enabled may mean that the transmission of the first channel needs to be performed after an LBT procedure, or the transmission of the first channel corresponds to the channel access procedure. In some embodiments, when it is determined according to the indication information to enable the short control information transmission, the transmission of the first channel does not correspond to the channel access procedure; and/or when it is determined according to the indication information not to enable the short control information transmission, the transmission of the first channel corresponds to the channel access procedure.

It should be understood that the LBT procedure does not need to be performed when the short control information transmission mode is enabled, so the transmission can always occur. In order to ensure the fairness of spectrum sharing, a certain condition needs to be satisfied in order to enable the short control information transmission, for example, a predetermined or configured duty cycle condition needs to be satisfied, or in other words, the time resource length occupied by all channels transmitted using short control information transmission should be shorter than or equal to a certain duty cycle.

It should be noted that the indication information used for determining whether to enable the short control information transmission here, and the indication information in the operation 420 above (that is, the indication information used for determining whether the transmission of the first channel corresponds to the channel access procedure and/or for determining the channel access parameter in the channel access procedure corresponding to the transmission of the first channel) may be different indication information, or may be the same indication information. When they are different indication information, one indicates whether to enable the short control information transmission, and the other indicates whether the transmission of the first channel corresponds to the channel access procedure and/or the channel access parameter in the channel access procedure corresponding to the transmission of the first channel. They are independent of each other and do not affect each other. When they are the same indication information, in addition to indicating whether the transmission of the first channel corresponds to the channel access procedure and/or the channel access parameter in the channel access procedure corresponding to the transmission of the first channel, the indication information further indicates whether to enable the short control information transmission; that is, the indication information jointly indicates whether the transmission of the first channel corresponds to the channel access procedure and/or the channel access parameter in the channel access procedure corresponding to the transmission of the first channel, and whether to enable the short control information transmission.

As an example, the first channel may include a PUSCH scheduled by a DCI format 0_0 and a PRACH. The indication information may indicate whether the DCI format 0_0 includes the channel access parameter indication information, and the indication information may further indicate whether the PRACH can be transmitted using the short control information transmission mode.

In some embodiments, when the indication information indicates not to enable the short control information transmission, the terminal device may determine that the channel access procedure needs to be performed before the transmission of the first channel (or the terminal device performs the channel access procedure before the transmission of the first channel), and/or when the indication information indicates to enable the short control information transmission, the terminal device may determine that no channel access procedure is needed before the transmission of the first channel (or the terminal device does not perform the channel access procedure before the transmission of the first channel).

In some embodiments, the indication information may jointly indicate whether to perform the channel access procedure and whether to enable the short control information transmission. For example, the indication information may indicate one of the following states: no channel access procedure, channel access procedure without short control information transmission enabled, or channel access procedure with short control information transmission enabled.

Exemplarily, when the indication information indicates that the channel access procedure is to be performed without the short control information transmission enabled, it may be considered that the first indication information indicates that some first channels such as PRACH or MsgA or PUCCH cannot be transmitted using the short control information transmission mode. When the indication information indicates that the channel access procedure is to be performed with short control information transmission enabled, it may be considered that the indication information indicates that some first channels such as PRACH or MsgA or PUCCH can be transmitted using short control information transmission mode. When the indication information indicates that the channel access procedure is not to be performed, it may be considered that the indication information indicates that the channel access procedure is not performed before the transmission of the first channel. When the indication information indicates that the channel access procedure is to be performed with short control information transmission enabled, or that the channel access procedure is to be performed without short control information transmission enabled, it can be considered that the indication information indicates that the channel access procedure is needed to be performed for some first channels such as PUSCH. That is, it may be determined whether some first channels correspond to the channel access procedure according to the indication information indicating whether to perform the channel access procedure, and it may be determined whether other first channels correspond to the channel access procedure according to the indication information indicating whether to enable the short control information transmission.

In some embodiments, instead of being indicated using special indication information, whether to enable the short control information transmission may be determined according to the indication information indicating whether to enable Discovery Burst Transmission Window (DBTW). In some embodiments, the DBTW may be used to transmit at least one of: SSB, Demodulation Reference Symbol (DMRS) associated with SSB, Type0-PDCCH, SIB1, or Channel State Information-Reference Symbol (CSI-RS).

In some embodiments, when the indication information indicates to enable the DBTW, the terminal device determines to enable the short control information transmission; and/or when the indication information indicates not to enable the DBTW, the terminal device determines not to enable the short control information transmission. In some embodiments, when the indication information indicates to enable the DBTW, the terminal device determines not to enable the short control information transmission; and/or when the indication information indicates not to enable the DBTW, the terminal device determines to enable the short control information transmission.

In some embodiments, the terminal device may determine whether to enable the DBTW according to the indication information. That is, the indication information may indicate whether to enable the DBTW. For example, the indication information may explicitly or implicitly indicate whether to enable the DBTW or not. In some embodiments, the indication information may directly or indirectly indicate whether to enable the DBTW or not. For example, the indication information may indicate to enable the DBTW (that is, with DBTW), or not to enable the DBTW (that is, without DBTW).

In some embodiments, when it is determined to enable the DBTW according to the indication information, the transmission of some first channels such as PUSCH may correspond to the channel access procedure; and/or when it is determined not to enable the DBTW according to the indication information, the transmission of some first channels, such as PRACH, MsgA, or PUCCH, may not correspond to the channel access procedure.

In some embodiments, when it is determined to enable the DBTW according to the indication information, the transmission of some first channels, such as PRACH, MsgA, or PUCCH, may not correspond to the channel access procedure; and/or when it is determined not to enable the DBTW according to the indication information, the transmission of some first channels such as PUSCH may correspond to the channel access procedure.

It should be noted that the indication information used for determining whether to enable the DBTW here, and the indication information in the operation 420 above (that is, the indication information used for determining whether the transmission of the first channel corresponds to the channel access procedure and/or for determining the channel access parameter in the channel access procedure corresponding to the transmission of the first channel) may be different indication information, or may be the same indication information. When they are different indication information, one indicates whether to enable the DBTW, and the other indicates whether the transmission of the first channel corresponds to the channel access procedure and/or the channel access parameter in the channel access procedure corresponding to the transmission of the first channel. They are independent of each other and do not affect each other. When they are the same indication information, in addition to indicating whether the transmission of the first channel corresponds to the channel access procedure and/or the channel access parameter in the channel access procedure corresponding to the transmission of the first channel, the indication information further indicates whether to enable the DBTW; that is, the indication information jointly indicates whether the transmission of the first channel corresponds to the channel access procedure and/or the channel access parameter in the channel access procedure corresponding to the transmission of the first channel, and whether to enable the DBTW.

In some embodiments, when the indication information indicates to enable the DBTW, the terminal device may determine that the channel access procedure needs to be performed before the transmission of some first channels such as PUSCH (or the terminal device performs the channel access procedure before the transmission of the first channels); and/or when the indication information indicates not to enable the DBTW, the terminal device may determine that no channel access procedure is needed before the transmission of some first channels, such as PRACH, MsgA, or PUCCH, (or the terminal device does not perform the channel access procedure before the transmission of the first channels).

In some embodiments, when the indication information indicates not to enable the DBTW, the terminal device may determine that the channel access procedure needs to be performed before the transmission of some first channels such as PUSCH (or the terminal device performs the channel access procedure before the transmission of the first channels); and/or when the indication information indicates to enable the DBTW, the terminal device may determine that no channel access procedure is needed before the transmission of some first channels, such as PRACH, MsgA, or PUCCH (or the terminal device does not perform the channel access procedure before the transmission of the first channels).

That is, for some first channels, it may be determined whether they correspond to the channel access procedure according to the indication information indicating whether to perform the channel access procedure, and for other first channels, it may be determined whether they correspond to the channel access procedure according to the indication information indicating whether to enable the DBTW.

In some embodiments, the indication information may jointly indicate whether to perform the channel access procedure and whether to enable the DBTW. For example, the indication information may indicate one of the following states: no channel access procedure (or the channel access procedure is not performed and the DBTW is not enabled), channel access procedure without DBTW enabled, or channel access procedure with DBTW enabled.

Exemplarily, when the indication information indicates that the channel access procedure is not to be performed without the DBTW enabled, or that the channel access procedure is to be performed without the DBTW enabled, it may be considered that the first indication information indicates not to enable the DBTW. When the indication information indicates that the channel access procedure is to be performed with the DBTW enabled, it may be considered that the indication information indicates to enable the DBTW. When the indication information indicates that the channel access procedure is not to be performed without the DBTW enabled, it may be considered that the indication information indicates not to perform the channel access procedure. When the indication information indicates that the channel access procedure is to be performed with the DBTW enabled, or that the channel access procedure is to be performed without the DBTW enabled, it may be considered that the indication information indicates to perform the channel access procedure.

In some embodiments, instead of being indicated using special indication information, whether to enable the DBTW may be determined according to the indication information indicating whether to enable short control information transmission. In some embodiments, when the indication information indicates to enable the short control information transmission, the terminal device may determine to enable the DBTW; and/or when the indication information indicates not to enable the short control information transmission, the terminal device may determine not to enable the DBTW. In some embodiments, when the indication information indicates to enable the short control information transmission, the terminal device may determine not to enable the DBTW; and/or when the indication information indicates not to enable the short control information transmission, the terminal device may determine to enable the DBTW.

In some embodiments, the indication information may be associated with a first subcarrier spacing (SCS). Correspondingly, the terminal device determining whether the transmission of the first channel corresponds to the channel access procedure and/or determining the channel access parameter in the channel access procedure corresponding to the transmission of the first channel according to the indication information may include: when the first channel corresponds to the first SCS (that is, the SCS corresponding to the first channel is the first SCS), the terminal device determining whether the transmission of the first channel corresponds to the channel access procedure and/or determining the channel access parameter in the channel access procedure corresponding to the transmission of the first channel according to the indication information; and/or when the first channel does not correspond to the first SCS (that is, the SCS corresponding to the first channel is the first SCS), the terminal device refraining from determining whether the transmission of the first channel corresponds to the channel access procedure and/or determining the channel access parameter in the channel access procedure corresponding to the transmission of the first channel according to the indication information. In some embodiments, when the first channel does not correspond to the first SCS, the terminal device may determine that the transmission of the first channel does not correspond to the channel access procedure, for example, it may determine that no channel access procedure needs to be performed before the transmission of the first channel.

For example, the indication information is associated with 120 kHz, and the transmission of the first channel may include PRACH or MsgA or PUCCH. When the SCS corresponding to the PRACH, MsgA, or PUCCH transmission is 120 kHz, the terminal device determines whether to perform the channel access procedure before the transmission of the PRACH or MsgA or PUCCH according to the indication information. In another example, the first indication information is associated with 120 kHz, and the transmission of the first channel includes PRACH, MsgA, or PUCCH. When the SCS corresponding to the PRACH, MsgA or PUCCH transmission is 960 kHz, the terminal device determines that it does not need to perform the channel access procedure before the transmission of the PRACH, MsgA, or PUCCH (or the terminal device does not perform channel access procedure before the transmission of the PRACH, MsgA, or PUCCH).

In some embodiments, an association between the indication information and the first SCS may be predefined or configured by a network device.

In an exemplary embodiment, the "indication information" described above may be first indication information as an example. The terminal device obtains the first indication information, and the terminal device determines whether to perform a channel access procedure before a transmission of a first channel and/or determines a channel access parameter in a channel access procedure performed before the transmission of the first channel according to the first indication information.

In some embodiments, the first indication information may be configured by a network device. For example, the terminal device may receive the first indication information transmitted by the network device. In another example, the terminal device receives first indication information transmitted by another terminal device, and the first indication information may be obtained by the other terminal device from a network device.

In some embodiments, the first indication information may be configured by another terminal device. For example, the terminal device may receive the first indication information transmitted by the other terminal device, and the first indication information may be configured by the other terminal device.

In some embodiments, the first indication information may be carried in a PBCH or MIB.

In some embodiments, the first indication information may indicate that the terminal device needs to perform the channel access procedure (for example, with LBT) and/or does not need to perform the channel access procedure (for example, without LBT) before the transmission of the first channel.

In some embodiments, the terminal device obtaining the first indication information may include: the terminal device obtaining the first indication information according to a GSCN. As an example, the first indication information may be determined according to a GSCN set to which the GSCN belongs. For example, the terminal device may obtain at least two GSCN sets. The at least two GSCN sets include a first GSCN set and a second GSCN set. The first GSCN set is associated with no need to perform the channel access procedure, and the second GSCN set is associated with a need to perform the channel access procedure. The terminal device determines that the first indication information indicates no need to perform the channel access procedure when the terminal device detects an SSB on a GSCN in the first GSCN set; or determines that the first indication information indicates the need to perform the channel access procedure when the terminal device detects an SSB on a GSCN in the second GSCN set.

In some embodiments, the transmission of the first channel may include at least one of: a PRACH, a MsgA, a Msg3 PUSCH scheduled by an RAR UL grant, a PUSCH scheduled by a DCI format 0_0, a PUCCH corresponding to a PDSCH scheduled by a DCI format 1_0, or a PUCCH corresponding to a successRAR.

In some embodiments, when the first indication information indicates that the channel access procedure needs to be performed, the grant information for scheduling the transmission of the first channel may include channel access parameter indication information; and/or when the first indication information indicates that no channel access procedure needs to be performed, the grant information for scheduling the transmission of the first channel may not include channel access parameter indication information. Here, the channel access parameter indication information may indicate a channel access parameter of the communication device (such as a terminal device) during the channel access procedure.

In some embodiments, the grant information for scheduling the transmission of the first channel may include at least one of: a DCI format 1_0, a DCI format 0_0, a UL grant in an RAR (the RAR is an RAR in the four-step random access procedure), a successRAR (the successRAR is an RAR in the two-step random access procedure), or a UL grant in a fallbackRAR (the fallbackRAR is an RAR in the two-step random access procedure).

In some embodiments, the DCI format 1_0 may be a DCI format scrambled with an SI-RNTI, TC-RNTI, C-RNTI, MCS-C-RNTI, or CS-RNTI.

In some embodiments, the DCI format 0_0 may be a DCI format scrambled with a TC-RNTI, C-RNTI, MCS-C-RNTI, or CS-RNTI.

In some embodiments, when the first indication information indicates that the channel access procedure needs to be performed, the terminal device needs to perform channel access before transmission of a PRACH, MsgA, or PUCCH; and/or when the first indication information indicates that no channel access procedure needs to be performed during the access procedure, the terminal device does not need to perform channel access before transmission of a PRACH, MsgA, or PUCCH.

In some embodiments, when the terminal device needs to perform channel access before transmission of a PRACH, MsgA, or PUCCH, the channel access parameter in the channel access procedure may be predefined.

In some embodiments, the first indication information may be associated with a first SCS. Correspondingly, the terminal device determining whether to perform the channel access procedure before the transmission of the first channel and/or determining the channel access parameter in the channel access procedure performed before the transmission of the first channel according to the first indication information may include: when the SCS corresponding to the transmission of the first channel is the first SCS, the terminal device determining whether to perform the channel access procedure before the transmission of the first channel and/or determining the channel access parameter in the channel access procedure performed before the transmission of the first channel according to the first indication information, and/or when the SCS corresponding to the transmission of the first channel is not the first SCS, the terminal device refraining from determining whether to perform the channel access procedure before the transmission of the first channel and/or determining the channel access parameter in the channel access procedure performed before the transmission of the first channel according to the first indication information. In some embodiments, when the SCS corresponding to the transmission of the first channel is not the first SCS, the terminal device may determine that no channel access procedure needs to be performed before the transmission of the first channel.

For example, the first indication information is associated with 120 kHz, and the transmission to be performed (that is, the transmission of the first channel) includes a PRACH, MsgA, or PUCCH transmission. When the SCS corresponding to the PRACH, MsgA, or PUCCH transmission is 120 kHz, the terminal device determines whether to perform the channel access procedure before the transmission of the PRACH or MsgA or PUCCH according to the first indication information. In another example, for example, the first indication information is associated with 120 kHz, and the transmission to be performed (that is, the transmission of the first channel) includes a PRACH, MsgA, or PUCCH transmission. When the SCS corresponding to the PRACH, MsgA, or PUCCH transmission is 480 kHz, the terminal device determines that no channel access procedure needs to be performed before the transmission of the PRACH, MsgA, or PUCCH (or the terminal device does not perform the channel access procedure before the transmission of the PRACH, MsgA, or PUCCH).

In some embodiments, an association between the first indication information and the first SCS may be predefined or indicated by a network device.

In some embodiments, the first indication information may indicate whether to enable a DBTW. For example, the first indication information may indicate to enable the DBTW (for example, with DBTW), and/or not to enable the DBTW (for example, without DBTW).

In some embodiments, when the first indication information indicates to enable the DBTW, the terminal device may determine that the channel access procedure needs to be performed before transmission of a PRACH, MsgA, or PUCCH (or the terminal device performs the channel access procedure before the transmission of the PRACH, MsgA or PUCCH); and/or when the first indication information indicates not to enable the DBTW, the terminal device may determine that no channel access procedure needs to be performed before the transmission of the PRACH, MsgA, or PUCCH (or the terminal device does not need to perform the channel access procedure before the transmission of the PRACH, MsgA, or PUCCH).

In some embodiments, when the first indication information indicates not to enable the DBTW, the terminal device may determine that the channel access procedure needs to be performed before transmission of a PRACH, MsgA, or PUCCH (or the terminal device performs the channel access procedure before the transmission of the PRACH, MsgA, or PUCCH); and/or when the first indication information indicates to enable the DBTW, the terminal device may determine that no channel access procedure needs to be performed before the transmission of the PRACH, MsgA, or PUCCH (or the terminal device does not need to perform the channel access procedure before the transmission of the PRACH, MsgA, or PUCCH).

In some embodiments, the first indication information may indicate whether to perform the channel access procedure and whether to enable the DBTW. For example, the first indication information may indicate one of the following states: no channel access procedure, channel access procedure to be performed, DBTW not enabled, or DBTW enabled.

In some embodiments, the first indication information may jointly indicate whether to perform the channel access procedure and whether to enable the DBTW. For example, the first indication information may indicate one of the following states: no channel access procedure without DBTW enabled (or no channel access procedure), channel access procedure without DBTW enabled, or channel access procedure with DBTW enabled. When the first indication information indicates that the channel access procedure is not to be performed without the DBTW enabled (or no channel access procedure is performed), or that the channel access procedure is to be performed with the DBTW enabled, it can be considered that the first indication information indicates not to enable the DBTW.

When the first indication information indicates that the channel access procedure is to be performed with the DBTW enabled, it may be considered that the first indication information indicates to enable the DBTW.

When the first indication information indicates that the channel access procedure is not to be performed without the DBTW enabled (or no channel access procedure is performed), it may be considered that the first indication information indicates not to perform the channel access procedure.

When the first indication information indicates that the channel access procedure is to be performed with the DBTW enabled, or that the channel access procedure is to be performed without the DBTW enabled, it may be considered that the first indication information indicates to perform the channel access procedure.

In some embodiments, the first indication information may indicate whether the terminal device satisfies a short control information transmission condition when transmitting the first channel. For example, when the first indication information indicates that the short control information transmission condition is not satisfied, the terminal device needs to perform channel access before the transmission of the first channel; and/or when the first indication information indicates that the short control information transmission condition is satisfied, the terminal device does not need to perform channel access before the transmission of the first channel.

In an exemplary embodiment, the "indication information" described above may be second indication information as an example. The terminal device obtains the second indication information, and the terminal device determines whether to perform a channel access procedure before a transmission of a first channel and/or determines a channel access parameter in a channel access procedure performed before the transmission of the first channel according to the second indication information.

In some embodiments, the second indication information may be configured by a network device. For example, the terminal device may receive the second indication information transmitted by the network device. In another example, the terminal device receives second indication information transmitted by another terminal device, and the second indication information may be obtained by the other terminal device from a network device.

In some embodiments, the second indication information may be configured by another terminal device. For example, the terminal device may receive the second indication information transmitted by the other terminal device, and the second indication information may be configured by the other terminal device.

In some embodiments, the second indication information may be carried in a system message. For example, the second indication information may be carried in SIB1, or the second indication information may be carried in another SIB different from SIB1.

In some embodiments, the second indication information may be carried in random access related configuration information. For example, the second indication information may be carried in random access related configuration information in a system message, or the second indication information may be carried in random access related configuration information in an RRC message, or the second indication information may be carried in random access related configuration information in a handover command.

In some embodiments, the second indication information may be carried in a handover command.

In some embodiments, the second indication information may indicate that the terminal device needs to perform the channel access procedure (for example, with LBT) and/or does not need to perform the channel access procedure (for example, without LBT) before the transmission of the first channel.

In some embodiments, the transmission of the first channel may include at least one of: a PRACH, a MsgA, a Msg3 PUSCH scheduled by an RAR UL grant, a PUSCH scheduled by a DCI format 0_0, or a PUCCH corresponding to a successRAR.

In some embodiments, the transmission of the first channel may further include a PUCCH corresponding to a PDSCH scheduled by a DCI format 1_0.

In some embodiments, when the second indication information indicates that the channel access procedure needs to be performed, the grant information for scheduling the transmission of the first channel may include channel access parameter indication information; and/or when the second indication information indicates that no channel access procedure needs to be performed, the grant information for scheduling the transmission of the first channel may not include channel access parameter indication information. Here, the channel access parameter indication information may indicate a related parameter of the communication device (such as a terminal device) during the channel access procedure.

In some embodiments, the grant information for scheduling the transmission of the first channel may include at least one of: a DCI format 0_0, a UL grant in an RAR (the RAR is an RAR in the four-step random access procedure), a successRAR (the successRAR is an RAR in the two-step random access procedure), or a UL grant in a fallbackRAR (the fallbackRAR is an RAR in the two-step random access procedure).

In some embodiments, the grant information for scheduling the transmission of the first channel may further include a DCI format 1_0.

In some embodiments, the DCI format 1_0 may be a DCI format scrambled with a TC-RNTI, C-RNTI, MCS-C-RNTI, or CS-RNTI.

In some embodiments, the DCI format 0_0 may be a DCI format scrambled with a TC-RNTI, C-RNTI, MCS-C-RNTI, or CS-RNTI.

In some embodiments, when the second indication information indicates that the channel access procedure needs to be performed, the terminal device needs to perform channel access before transmitting a PRACH, MsgA, or PUCCH; and/or when the second indication information indicates that no channel access procedure needs to be performed, the terminal device does not need to perform channel access before transmitting a PRACH, MsgA, or PUCCH.

In some embodiments, the second indication information indicating whether the channel access procedure needs to be performed may include: the second indication information indicating whether a short control information transmission condition is satisfied; or the second indication information indicating a time length allowed for short control information transmission, or when the short control information transmission condition is satisfied, the second indication information indicating that no channel access procedure needs to be performed; or when the short control information transmission condition is not satisfied, the second indication information indicating that the channel access procedure needs to be performed.

In some embodiments, when the second indication information indicates that the short control information transmission condition is not satisfied, the terminal device may need to perform channel access before transmitting a PRACH, MsgA, or PUCCH; and/or when the second indication information indicates that the short control information transmission condition is satisfied, the terminal device may not need to perform channel access before transmitting a PRACH, MsgA, or PUCCH.

In some embodiments, when the terminal device needs to perform channel access before transmitting a PRACH, MsgA, or PUCCH, the channel access parameter in the channel access procedure may be predefined.

In some embodiments, the second indication information may be associated with a second SCS. Correspondingly, the terminal device determining whether to perform the channel access procedure before the transmission of the first channel and/or determining the channel access parameter in the channel access procedure performed before the transmission of the first channel according to the second indication information may include: when the SCS corresponding to the transmission of the first channel is the second SCS, the terminal device determining whether to perform the channel access procedure before the transmission of the first channel and/or determining the channel access parameter in the channel access procedure performed before the transmission of the first channel according to the second indication information, and/or when the SCS corresponding to the transmission of the first channel is not the second SCS, the terminal device refraining from determining whether to perform the channel access procedure before the transmission of the first channel and/or the channel access parameter in the channel access procedure performed before the transmission of the first channel according to the second indication information. In some embodiments, when the SCS corresponding to the transmission of the first channel is not the second SCS, the terminal device may determine that no channel access procedure needs to be performed before the transmission of the first channel.

For example, the second indication information is associated with 120 kHz, and the transmission to be performed (that is, the transmission of the first channel) includes a PRACH, MsgA, or PUCCH. When the SCS corresponding to the transmission of the PRACH, MsgA, or PUCCH is 120 kHz, the terminal device determines whether to perform the channel access procedure before the transmission of the PRACH, MsgA, or PUCCH according to the second indication information. In another example, for example, the second indication information is associated with 120 kHz, and the transmission to be performed (that is, the transmission of the first channel) includes a PRACH, MsgA, or PUCCH. When the SCS corresponding to the transmission of the PRACH, MsgA or PUCCH is 960 kHz, the terminal device determines that no channel access procedure needs to be performed before the transmission of the PRACH, MsgA, or PUCCH (or the terminal device does not perform the channel access procedure before the transmission of the PRACH, MsgA, or PUCCH).

In some embodiments, an association between the second indication information and the second SCS may be predefined or indicated by a network device.

In some embodiments, the first indication information may indicate whether grant information for scheduling the transmission of the first channel includes channel access parameter indication information, the grant information for scheduling the transmission of the first channel including at least one of: a DCI format 1_0 or a DCI format 0_0; and/or the second indication information may indicate whether grant information for scheduling the transmission of the first channel includes channel access parameter indication information, the grant information for scheduling the transmission of the first channel including at least one of: a UL grant in an RAR (the RAR is an RAR in the four-step random access procedure), a successRAR (the successRAR is an RAR in the two-step random access procedure), or a UL grant in a fallbackRAR (the fallbackRAR is an RAR in the two-step random access procedure).

In some embodiments, the first indication information may indicate whether grant information for scheduling the transmission of the first channel includes channel access parameter indication information, the grant information for scheduling the transmission of the first channel including a DCI format 1_0; and/or the second indication information may indicate whether the grant information for scheduling the transmission of the first channel includes channel access parameter indication information, the grant information for scheduling the transmission of the first channel including at least one of: a DCI format 0_0, a UL grant in an RAR (the RAR is an RAR in the four-step random access procedure), a successRAR (the successRAR is an RAR in the two-step random access procedure), or a UL grant in a fallbackRAR (the fallbackRAR is an RAR in the two-step random access procedure).

In some embodiments, the first indication information may indicate whether grant information for scheduling the transmission of the first channel includes channel access parameter indication information, the grant information for scheduling the transmission of the first channel including a DCI format 1_0 scrambled with an SI-RNTI; and/or the second indication information may indicate whether grant information for scheduling the transmission of the first channel includes channel access parameter indication information, the grant information for scheduling the transmission of the first channel including at least one of: a DCI format 1_0 scrambled with another RNTI different from SI-RNTI, a DCI format 0_0, a UL grant in an RAR (the RAR is an RAR in the four-step random access procedure), a successRAR (the successRAR is an RAR in the two-step random access procedure), a UL grant in a fallbackRAR (the fallbackRAR is an RAR in the two-step random access procedure).

In the exemplary embodiment, the "indication information" described above may be third indication information as an example. The terminal device obtains the third indication information, and the terminal device determines whether to perform a channel access procedure before a transmission of a first channel and/or determines a channel access parameter in a channel access procedure performed before the transmission of the first channel according to the third indication information. Here, the transmission of the first channel includes a transmission of a PRACH, MsgA, or PUCCH.

In some embodiments, the third indication information may be carried in a system message. For example, the third indication information may be carried in SIB1, or the third indication information may be carried in another SIB different from SIB1.

In some embodiments, the third indication information may be carried in random access related configuration information. For example, the third indication information may be carried in random access related configuration information in a system message, or the third indication information may be carried in random access related configuration information in an RRC message, or the third indication information may be carried in random access related configuration information in a handover command.

In some embodiments, the third indication information may be carried in a handover command.

In some embodiments, the third indication information may indicate that the terminal device needs to perform the channel access procedure (for example, with LBT) and/or does not need to perform the channel access procedure (for example, without LBT) before the transmission of the PRACH, MsgA, or PUCCH.

In some embodiments, the third indication information may indicate whether the terminal device satisfies a short control information transmission condition in the transmission of the PRACH, MsgA, or PUCCH. For example, when the third indication information indicates that the short control information transmission condition is not satisfied, the terminal device needs to perform channel access before the transmission of the PRACH, MsgA, or PUCCH; and/or when the third indication information indicates that the short control information transmission condition is satisfied, the terminal device does not need to perform channel access before the transmission of the PRACH, MsgA, or PUCCH.

In some embodiments, when the third indication information indicates that the channel access procedure is to be performed, the terminal device may determine that the channel access procedure needs to be performed before the transmission of the PRACH, MsgA, or PUCCH (or the terminal device performs the channel access procedure before the transmission of the PRACH, MsgA, or PUCCH); and/or when the third indication indicates that no channel access procedure needs to be performed, the terminal device may determine that no channel access procedure needs to be performed before the transmission of the PRACH, MsgA, or PUCCH (or the terminal device does not need to perform the channel access procedure before the transmission of the PRACH, MsgA, or PUCCH).

In an exemplary embodiment, the "indication information" described above may be fourth indication information as an example. The terminal device obtains the fourth indication information; and the terminal device determines whether to perform a channel access procedure before a transmission of a first channel and/or determines a channel access parameter in a channel access procedure performed before the transmission of the first channel according to the fourth indication information. Here, the transmission of the first channel includes a transmission scheduled by a non-fallback DCI format (such as DCI format 1_1, DCI format 0_1, DCI format 1_2, DCI format 0_2, DCI format 3_0, or DCI format 3_1, etc.) or an SCI format (such as SCI format 2-A, or SCI format 2-B, etc.).

In some embodiments, the fourth indication information may be carried in an RRC message, a MAC CE message, or group common DCI. For example, the fourth indication information may be carried in a dedicated RRC message configured on the terminal device.

In an exemplary embodiment, the terminal device receives at least one of first indication information, second indication information, third indication information, or fourth indication information transmitted by a network device (or another terminal device).

The first indication information indicates whether grant information for scheduling the transmission of the first channel includes channel access parameter indication information, the grant information for scheduling the transmission of the first channel including at least one of: DCI format 1_0 or DCI format 0_0.

The second indication information indicates whether grant information for scheduling the transmission of the first channel includes channel access parameter indication information, the grant information for scheduling the transmission of the first channel including at least one of: a UL grant in an RAR (the RAR is an RAR in the four-step random access procedure), a successRAR (the successRAR is an RAR in the two-step random access procedure), or a UL grant in a fallbackRAR (the fallbackRAR is an RAR in the two-step random access procedure).

The third indication information indicates whether the terminal device performs the channel access procedure before a transmission of a PRACH, MsgA, or PUCCH.

The fourth indication information indicates whether grant information for scheduling the transmission of the first channel includes channel access parameter indication information, the grant information for scheduling the transmission of the first channel including at least one of: a DCI format 1_1, a DCI format 0_1, a DCI format 1_2, a DCI format 0_2, a DCI format 3_0, a DCI format 3_1, an SCI format 2-A, or an SCI format 2-B.

In an exemplary embodiment, the terminal device receives indication information transmitted by a network device (or another terminal device).

The indication information indicates whether the transmission of the PRACH, MsgA, or PUCCH of the terminal device corresponds to a channel access procedure; and/or the indication information indicates whether grant information for scheduling the transmission of the first channel includes channel access parameter indication information, the grant information for scheduling the transmission of the first channel including at least one of: DCI format 0_0, a UL grant in an RAR (the RAR is an RAR in the four-step random access procedure), or a UL grant in a fallbackRAR (the fallbackRAR is an RAR in the two-step random access procedure).

In this example, the channel access parameter indication information is not included in the DCI format 1_0. Further in some embodiments, the PUCCH corresponding to the PDSCH scheduled by DCI format 1_0 does not correspond to the channel access procedure. Alternatively, when the PUCCH corresponding to the PDSCH scheduled by DCI format 1_0 corresponds to the channel access procedure, the channel access parameter in the channel access procedure corresponding to the PUCCH is predefined.

In this example, the successRAR (the successRAR is an RAR in the two-step random access procedure) does not include channel access parameter indication information. Further in some embodiments, the PUCCH corresponding to the successRAR does not correspond to the channel access procedure. Alternatively, when the PUCCH corresponding to the successRAR corresponds to the channel access procedure, the channel access parameter in the channel access procedure corresponding to the PUCCH is predefined.

In this example, the indication information may be at least one of the above first indication information, second indication information, third indication information, or fourth indication information.

With the solutions of the present disclosure, the terminal device can determine whether a channel access procedure is required during an initial access procedure according to the obtained indication information, so as to determine a DCI size or an RAR type to be demodulated during the initial access procedure, or determine whether to perform the channel access procedure during a PRACH or MsgA transmission process, thereby avoiding ambiguity in understanding between the terminal device and the network device, and ensuring completion of the initial access. The present disclosure can also ensure the fairness of spectrum sharing when wireless communication is performed on a carrier on the shared spectrum between communication devices (for example, a network device and a terminal device).

It should be noted that the above operations performed by the terminal device can be independently implemented as a wireless communication method at the terminal device, and the above operations performed by the network device can be independently implemented as a wireless communication method at the network device.

The apparatus embodiments of the present disclosure will be described. The apparatuses can be configured to perform the method embodiments of the present disclosure. For details not disclosed in the apparatus embodiments of the present disclosure, reference can be made to the method embodiments of the present disclosure.

Reference is now made to FIG. 5, which shows a block diagram of a wireless communication apparatus according to an embodiment of the present disclosure. The apparatus has the function of implementing the above method example at the terminal device, and the function may be implemented by hardware, or by hardware executing corresponding software. The apparatus can be the terminal device described above, or can be provided in the terminal device. As shown in FIG. 5, the apparatus 500 may include an obtaining module 510 and a determining module 520.

The obtaining module 510 is configured to obtain indication information.

The determining module 520 is configured to determine whether a transmission of a first channel corresponds to a channel access procedure and/or determine a channel access parameter in a channel access procedure corresponding to the transmission of the first channel according to the indication information.

In some embodiments, the determining module 520 may be configured to perform at least one of:

determining whether the transmission of the first channel corresponds to the channel access procedure according to the indication information;

determining whether channel access parameter indication information is included in grant information for scheduling the transmission of the first channel according to the indication information; or determining whether the transmission of the first channel corresponds to a Cyclic Prefix (CP) extension according to the indication information.

In some embodiments, the grant information for scheduling the transmission of the first channel may include the channel access parameter indication information when it is determined according to the indication information that the transmission of the first channel corresponds to the channel access procedure; or the grant information for scheduling the transmission of the first channel may not include the channel access parameter indication information when it is determined according to the indication information that the transmission of the first channel does not correspond to the channel access procedure.

In some embodiments, the channel access parameter in the channel access procedure may be predefined when it is determined according to the indication information that the transmission of the first channel corresponds to the channel access procedure.

In some embodiments, the channel access parameter indication information may indicate at least one of: a type of a channel access scheme, whether to perform a channel access procedure, whether it corresponds to a CP extension, or a length of the CP extension.

In some embodiments, a length of the CP extension may be predefined when it is determined according to the indication information that the transmission of the first channel corresponds to the CP extension.

In some embodiments, the terminal device may perform the channel access procedure before the transmission of the first channel when it is determined according to the indication information that the transmission of the first channel corresponds to the channel access procedure; and/or the terminal device may perform no channel access procedure before the transmission of the first channel when it is determined according to the indication information that the transmission of the first channel does not correspond to the channel access procedure.

In some embodiments, the first channel may include at least one of: a Physical Uplink Shared Channel (PUSCH) scheduled by a Downlink Control Information (DCI) format 0_1, a PUSCH scheduled by a DCI format 0_2, a Physical Uplink Control Channel (PUCCH) corresponding to a Physical Downlink Shared Channel (PDSCH) scheduled by a DCI format 1_1, a PUCCH corresponding to a PDSCH scheduled by a DCI format 1_2, a sidelink scheduled by a Sidelink Control Information (SCI) format, or a feedback link corresponding to a sidelink scheduled by an SCI format.

In some embodiments, the first channel may include at least one of: a PUSCH scheduled by a Random Access Response (RAR) uplink grant, a PUSCH scheduled by a fallback Random Access Response (fallbackRAR) uplink grant, a PUCCH corresponding to a successful Random Access Response (successRAR), or a PUSCH scheduled by a DCI format 0_0.

In some embodiments, the first channel may include at least one of: a Physical Random Access Channel (PRACH) or a message (MsgA), the MsgA including a PRACH and a MsgA PUSCH.

In some embodiments, the first channel may include a PUCCH corresponding to a PDSCH scheduled by a DCI format 1_0.

In some embodiments, the indication information may be carried in a Physical Broadcast Channel (PBCH) or a Master Information Block (MIB).

In some embodiments, the indication information may be obtained according to a Global Synchronization Channel Number (GSCN).

In some embodiments, the obtaining module 510 may be configured to obtain the indication information according to at least two GSCN sets, the at least two GSCN sets including a first GSCN set and a second GSCN set, the first GSCN set being associated with not corresponding to the channel access procedure, and the second GSCN set being associated with corresponding to the channel access procedure;

the determining module 520 may be configured to: determine that the transmission of the first channel does not correspond to the channel access procedure when the terminal device detects a Synchronization Signal Block (SSB) on a GSCN in the first GSCN set; and/or determine that the first channel corresponds to the channel access procedure when the terminal device detects an SSB on a GSCN in the second GSCN set.

In some embodiments, the indication information may be carried in at least one of: a system message, random access related configuration information, a handover command, or a cell common Radio Resource Control (RRC) message.

In some embodiments, the indication information may be carried in at least one of: a terminal device dedicated RRC message, a Media Access Control Control Element (MAC CE), or group common DCI.

In some embodiments, the determining module 520 may be further configured to determine whether to enable short control information transmission according to the indication information.

In some embodiments, the transmission of the first channel may not correspond to the channel access procedure when it is determined according to the indication information to enable the short control information transmission; and/or the transmission of the first channel may correspond to the channel access procedure when it is determined according to the indication information not to enable the short control information transmission.

In some embodiments, the determining module 520 may be further configured to determine whether to enable Discovery Burst Transmission Window (DBTW) according to the indication information.

In some embodiments, the transmission of the first channel may correspond to the channel access procedure when it is determined to enable the DBTW according to the indication information; and/or the transmission of the first channel may not correspond to a channel access procedure when it is determined according to the indication information not to enable the DBTW.

In some embodiments, the transmission of the first channel may not correspond to a channel access procedure when it is determined according to the indication information to enable the DBTW; and/or the transmission of the first channel may correspond to the channel access procedure when it is determined according to the indication information not to enable the DBTW.

In some embodiments, the indication information may be associated with a first subcarrier spacing (SCS).

In some embodiments, the determining module 520 may be further configured to: determine whether the transmission of the first channel corresponds to the channel access procedure and/or determine the channel access parameter in the channel access procedure corresponding to the transmission of the first channel according to the indication information when the first channel corresponds to the first SCS; and/or refrain from determining whether the transmission of the first channel corresponds to the channel access procedure and/or determining the channel access parameter in the channel access procedure corresponding to the transmission of the first channel according to the indication information when the first channel does not correspond to the first SCS.

In some embodiments, it may be determined that the transmission of the first channel does not correspond to the channel access procedure when the first channel does not correspond to the first SCS.

In some embodiments, an association between the indication information and the first SCS may be predefined or configured by a network device.

Reference is now made to FIG. 6, which shows a block diagram of a wireless communication method according to another embodiment of the present disclosure. The apparatus has the function of implementing the method example at the network device, and the function may be implemented by hardware, or by hardware executing corresponding software. The apparatus may be the network device described above, or may be provided in the network device. As shown in FIG. 6, the apparatus 600 may include a transmitting module 610.

The transmitting module 610 is configured to transmit indication information to a terminal device, the indication information being used for determining whether a transmission of a first channel corresponds to a channel access procedure and/or determining a channel access parameter in a channel access procedure corresponding to the transmission of the first channel.

In some embodiments, the indication information may be used to determine at least one of: whether the transmission of the first channel corresponds to the channel access procedure; whether channel access parameter indication information is included in grant information for scheduling the transmission of the first channel; or whether the transmission of the first channel corresponds to a Cyclic Prefix (CP) extension.

In some embodiments, the grant information for scheduling the transmission of the first channel may include the channel access parameter indication information when it is determined according to the indication information that the transmission of the first channel corresponds to the channel access procedure; or the grant information for scheduling the transmission of the first channel may not include the channel access parameter indication information when it is determined according to the indication information that the transmission of the first channel does not correspond to the channel access procedure.

In some embodiments, the channel access parameter in the channel access procedure may be predefined when it is determined according to the indication information that the transmission of the first channel corresponds to the channel access procedure.

In some embodiments, the channel access parameter indication information may indicate at least one of: a type of a channel access scheme, whether to perform a channel access procedure, whether it corresponds to a CP extension, or a length of the CP extension.

In some embodiments, a length of the CP extension may be predefined when it is determined according to the indication information that the transmission of the first channel corresponds to the CP extension.

In some embodiments, the channel access procedure may be performed before the transmission of the first channel when it is determined according to the indication information that the transmission of the first channel corresponds to the channel access procedure; and/or no channel access procedure may be performed before the transmission of the first channel when it is determined according to the indication information that the transmission of the first channel does not correspond to the channel access procedure.

In some embodiments, the first channel may include at least one of: a Physical Uplink Shared Channel (PUSCH) scheduled by a Downlink Control Information (DCI) format 0_1, a PUSCH scheduled by a DCI format 0_2, a Physical Uplink Control Channel (PUCCH) corresponding to a Physical Downlink Shared Channel (PDSCH) scheduled by a DCI format 1_1, a PUCCH corresponding to a PDSCH scheduled by a DCI format 1_2, a sidelink scheduled by a Sidelink Control Information (SCI) format, or a feedback link corresponding to a sidelink scheduled by an SCI format.

In some embodiments, the first channel may include at least one of: a PUSCH scheduled by a Random Access Response (RAR) uplink grant, a PUSCH scheduled by a fallback Random Access Response (fallbackRAR) uplink grant, a PUCCH corresponding to a successful Random Access Response (successRAR), or a PUSCH scheduled by a DCI format 0_0.

In some embodiments, the first channel may include at least one of: a Physical Random Access Channel (PRACH) or a message (MsgA), the MsgA including a PRACH and a MsgA PUSCH.

In some embodiments, the first channel may include a PUCCH corresponding to a PDSCH scheduled by a DCI format 1_0.

In some embodiments, the indication information may be carried in a Physical Broadcast Channel (PBCH) or a Master Information Block (MIB).

In some embodiments, the indication information may be obtained according to a Global Synchronization Channel Number (GSCN).

In some embodiments, the terminal device may obtain the indication information according to at least two GSCN sets, the at least two GSCN sets including a first GSCN set and a second GSCN set, the first GSCN set being associated with not corresponding to the channel access procedure, and the second GSCN set being associated with corresponding to the channel access procedure; the terminal device may determine that the transmission of the first channel does not correspond to the channel access procedure when the terminal device detects a Synchronization Signal Block (SSB) on a GSCN in the first GSCN set; and/or the terminal device may determine that the first channel corresponds to the channel access procedure when the terminal device detects an SSB on a GSCN in the second GSCN set.

In some embodiments, the indication information may be carried in at least one of: a system message, random access related configuration information, a handover command, or a cell common Radio Resource Control (RRC) message.

In some embodiments, the indication information may be carried in at least one of: a terminal device dedicated RRC message, a Media Access Control Control Element (MAC CE), or group common DCI.

In some embodiments, the indication information may be used to determine whether to enable short control information transmission.

In some embodiments, the transmission of the first channel may not correspond to the channel access procedure when it is determined according to the indication information to enable the short control information transmission; and/or the transmission of the first channel may correspond to the channel access procedure when it is determined according to the indication information not to enable the short control information transmission.

In some embodiments, the indication information may be used to determine whether to enable Discovery Burst Transmission Window (DBTW).

In some embodiments, the transmission of the first channel may correspond to the channel access procedure when it is determined to enable the DBTW according to the indication information; and/or the transmission of the first channel may not correspond to a channel access procedure when it is determined according to the indication information not to enable the DBTW.

In some embodiments, the transmission of the first channel may not correspond to a channel access procedure when it is determined according to the indication information to enable the DBTW; and/or the transmission of the first channel may correspond to the channel access procedure when it is determined according to the indication information not to enable the DBTW.

In some embodiments, the indication information may be associated with a first subcarrier spacing (SCS).

In some embodiments, the terminal device may determine whether the transmission of the first channel corresponds to the channel access procedure and/or determine the channel access parameter in the channel access procedure corresponding to the transmission of the first channel according to the indication information when the first channel corresponds to the first SCS; and/or the terminal device may refrain from determining whether the transmission of the first channel corresponds to the channel access procedure and/or determining the channel access parameter in the channel access procedure corresponding to the transmission of the first channel according to the indication information when the first channel does not correspond to the first SCS.

In some embodiments, it may be determined that the transmission of the first channel does not correspond to the channel access procedure when the first channel does not correspond to the first SCS.

In some embodiments, an association between the indication information and the first SCS may be predefined or configured by the network device.

It should be noted that, when the apparatus provided in any of the above embodiments achieves its functions, the division of the above functional modules is provided for the purpose of illustration only. In practice, the above functions can be allocated to different functional modules depending on actual requirements. That is, the content/structure of the apparatus can be divided into different functional modules to complete all or part of the functions described above.

Regarding the apparatus in any of the above embodiment, the specific operation of each module has been described in detail in the corresponding method embodiments, and description thereof will be omitted here.

Reference is now made to FIG. 7, which is a schematic diagram showing a structure of a terminal device 70 according to an embodiment of the present disclosure. The terminal device 70 may include: a processor 71, a receiver 72, a transmitter 73, a memory 74, and a bus 75.

The processor 71 includes one or more processing cores, and the processor 71 implements various functional applications and information processing by executing software programs and modules.

The receiver 72 and the transmitter 73 may be implemented as a transceiver 76, which may be a communication chip.

The memory 74 is connected to the processor 71 through the bus 75.

The memory 74 can store a computer program, and the processor 71 can be configured to execute the computer program, so as to implement various operations performed by the terminal device in the above method embodiments.

In addition, the memory 74 can be implemented by any type of volatile or non-volatile storage device or any combination thereof, the volatile or non-volatile storage device including, but not limited to: Random-Access Memory (RAM), Read-Only Memory (ROM), Erasable Programmable Read-Only Memory (EPROM), Electrically Erasable Programmable Read-Only Memory (EEPROM), flash memory or other solid state storage technology, Compact Disc Read-Only Memory (CD-ROM), Digital Video Disc (DVD) or other optical storage, cassette, magnetic tape, magnetic disk storage or other magnetic storage device.

In an exemplary embodiment, the processor 71 is configured to obtain indication information; and determine whether a transmission of a first channel corresponds to a channel access procedure and/or determine a channel access parameter in a channel access procedure corresponding to the transmission of the first channel according to the indication information.

For details that are not described in detail in this embodiment, reference may be made to the above embodiments, and descriptions thereof will not be repeated here.

FIG. 8 is a schematic diagram showing a structure of a network device 80 according to an embodiment of the present disclosure. The network device 80 may include: a processor 81, a receiver 82, a transmitter 83, a memory 84, and a bus 85.

The processor 81 includes one or more processing cores, and the processor 81 executes various functional applications and information processing by executing software programs and modules.

The receiver 82 and the transmitter 83 can be implemented as a transceiver 86, and the transceiver 86 can be a communication chip.

The memory 84 is connected to the processor 81 via the bus 85.

The memory 84 may store a computer program, and the processor 81 may be configured to execute the computer program, so as to implement various operations performed by the network device in the above method embodiments.

In addition, the memory 84 can be achieved by any type of volatile or non-volatile storage device or any combination thereof, and the volatile or non-volatile storage device includes, but not limited to: Random-Access Memory (RAM), Read-Only Memory (ROM), Erasable Programmable Read-Only Memory (EPROM), Electrically Erasable Programmable Read-Only Memory (EEPROM), flash memory or another solid-state storage technology, Compact Disc Read-Only Memory (CD-ROM), Digital Video Disc (DVD) or another optical storage, tape cartridge, tape, disks storage or another magnetic storage device.

In an exemplary embodiment, the transceiver 86 is configured to transmit indication information to a terminal device, the indication information being used for determining whether a transmission of a first channel corresponds to a channel access procedure and/or determining a channel access parameter in a channel access procedure corresponding to the transmission of the first channel.

For details not described in detail in this embodiment, reference may be made to the descriptions in the above embodiments, and details thereof will be omitted here.

According to an embodiment of the present disclosure, a computer-readable storage medium is provided. The computer-readable storage medium has a computer program stored therein. The computer program is configured to be executed by a processor of a terminal device to perform the above wireless communication method in the terminal device.

According to an embodiment of the present disclosure, a computer-readable storage medium is provided. The computer-readable storage medium has a computer program stored therein. The computer program is configured to be executed by a processor of a network device to perform the above wireless communication method in the network device.

In some embodiments, the computer-readable storage medium may include: Read-Only Memory (ROM), Random-Access Memory (RAM), Solid State Drives (SSD), or optical disc, etc. Here, the random access memory may include Resistance Random Access Memory (ReRAM) and Dynamic Random Access Memory (DRAM).

According to an embodiment of the present disclosure, a chip is provided. The chip includes a programmable logic circuit and/or program instructions. The chip, when running on a terminal device, is configured to perform the above wireless communication method at the terminal device.

According to an embodiment of the present disclosure, a chip is provided. The chip includes a programmable logic circuit and/or program instructions. The chip, when running on a network device, is configured to perform the above wireless communication method at the network device.

In an aspect of the embodiments of the present disclosure, a computer program product or computer program is provided. The computer program product or computer program includes computer instructions stored in a computer-readable storage medium. A processor of a terminal device reads and executes the computer instructions from the computer-readable storage medium to perform the above wireless communication method at the terminal device.

In an aspect of the embodiments of the present disclosure, a computer program product or computer program is provided. The computer program product or computer program includes computer instructions stored in a computer-readable storage medium. A processor of a network device reads and executes the computer instructions from the computer-readable storage medium to perform the above wireless communication method at the network device.

It can be appreciated that the term "indication" as used in the embodiments of the present disclosure may be a direct indication, an indirect indication, or an association. For example, if A indicates B, it may mean that A directly indicates B, e.g., B can be obtained from A. Alternatively, it may mean that A indicates B indirectly, e.g., A indicates C and B can be obtained from C. Alternatively, it may mean that there is an association between A and B.

In the description of the embodiments of the present disclosure, the term "corresponding" may mean that there is a direct or indirect correspondence between the two, or may mean that there is an association between the two, or that they are in a relation of indicating and indicated, configuring or configured, or the like.

In the embodiments of the present disclosure, "predefined" may be implemented as pre-stored in one or more devices (for example, including a terminal device and a network device) corresponding codes, tables or other means that can be used to indicate related information, and the present disclosure is not limited to its specific implementation. For example, "predefined" may refer to defined in protocols.

In the embodiments of the present disclosure, "protocols" may refer to standard protocols in the communication field, including e.g., the LTE protocol, the NR protocol, and related protocols applied in future communication systems. The present disclosure is not limited to any of these examples.

The term "plurality" as used herein means two or more. The term "and/or" as used herein only represents a relationship between correlated objects, including three relationships. For example, "A and/or B" may mean A only, B only, or both A and B. In addition, the symbol "/" as used herein represents an "or" relationship between the correlated objects preceding and succeeding the symbol.

In addition, the numbering of the operations described herein only exemplarily shows a possible sequence of execution among the operations. In some other embodiments, the above operations may not be executed according to the order of their numbering. For example, two operations with different numbers may be executed at the same time, or two operations with different numbers may be executed in a reversed order of the one shown in the figure, and the embodiment of the present disclosure is not limited to this.

It can be appreciated by those skilled in the art that, in one or more of the above examples, the functions described in the embodiments of the present disclosure may be implemented by hardware, software, firmware, or any combination thereof. When implemented by software, the functions may be stored in a computer-readable medium or transmitted as one or more instructions or codes on a computer-readable medium. The computer-readable medium includes a computer storage medium and a communication medium. The communication medium includes any medium that facilitates transfer of a computer program from one place to another. The storage medium can be any available medium that can be accessed by a general purpose or special purpose computer.

While the preferred embodiments of the present disclosure have been described above, they are not intended to limit the present disclosure. Any modifications, equivalents, or improvements that can be made within the spirit and principle of the present disclosure are to be encompassed by the scope of the present disclosure.

What is claimed is:

1. A wireless communication method, performed by a terminal device, the method comprising:

obtaining indication information, wherein the indication information is carried in a system message;

determining whether channel access parameter indication information is included in grant information for scheduling a transmission of a first channel according to the indication information; wherein the channel access parameter indication information indicates a type of a channel access scheme; and determining whether to enable short control information transmission according to the indication information, wherein the transmission of the first channel does not correspond to a channel access procedure when it is determined according to the indication information to enable the short control information transmission; and the transmission of the first channel corresponds to the channel access procedure when it is determined according to the indication information not to enable the short control information transmission.

2. The method according to claim 1, wherein grant information for scheduling the transmission of the first channel includes channel access parameter indication information when it is determined according to the indication information that the transmission of the first channel corresponds to the channel access procedure; or the grant information for scheduling the transmission of the first channel does not include the channel access parameter indication information when it is determined according to the indication information that the transmission of the first channel does not correspond to the channel access procedure;

wherein the channel access parameter indication information indicates a type of a channel access scheme.

3. The method according to claim 1, further comprising: performing the channel access procedure before the transmission of the first channel when it is determined according to the indication information that the transmission of the first channel corresponds to the channel access procedure; and/or not performing channel access procedure before the transmission of the first channel when it is determined according to the indication information that the transmission of the first channel does not correspond to the channel access procedure.

4. The method according to claim 1, wherein the first channel comprises at least one of:

a Physical Uplink Shared Channel (PUSCH) scheduled by a Downlink Control Information (DCI) format 0_1, a PUSCH scheduled by a DCI format 0_2, a Physical Uplink Control Channel (PUCCH) corresponding to a Physical Downlink Shared Channel (PDSCH) scheduled by a DCI format 1_1, a PUCCH corresponding to a PDSCH scheduled by a DCI format 1_2, a sidelink scheduled by a Sidelink Control Information (SCI) format, or a feedback link corresponding to a sidelink scheduled by an SCI format;

a PUSCH scheduled by a Random Access Response (RAR) uplink grant, a PUSCH scheduled by a fallback Random Access Response (fallbackRAR) uplink grant, a PUCCH corresponding to a successful Random Access Response (successRAR), or a PUSCH scheduled by a DCI format 0_0;

a PUCCH corresponding to a PDSCH scheduled by a DCI format 1_0.

5. The method according to claim 1, wherein the first channel comprises at least one of:

a Physical Random Access Channel (PRACH) or a message MsgA, the MsgA including a PRACH and a MsgA PUSCH.

6. A terminal device, comprising a processor and a memory, the memory storing a computer program and the processor being configured to execute the computer program to implement:

obtaining indication information, wherein the indication information is carried in a system message;

determining whether channel access parameter indication information is included in grant information for scheduling a transmission of a first channel according to the indication information; wherein the channel access parameter indication information indicates a type of a channel access scheme; and determining whether to enable short control information transmission according to the indication information, wherein the transmission of the first channel does not correspond to a channel access procedure when it is determined according to the indication information to enable the short control information transmission; and the transmission of the first channel corresponds to the channel access procedure when it is determined according to the indication information not to enable the short control information transmission.

7. A network device, comprising a processor and a memory, the memory storing a computer program and the processor being configured to execute the computer program to implement:

transmitting indication information to a terminal device, wherein the indication information is carried in a system message, and the indication information is used for determining whether channel access parameter indication information is included in grant information for scheduling a transmission of a first channel according to the indication information; wherein the channel access parameter indication information indicates a type of a channel access scheme, and determining whether to enable short control information transmission according to the indication information, wherein the transmission of the first channel does not correspond to a channel access procedure when it is determined according to the indication information to enable the short control information transmission; and the transmission of the first channel corresponds to the channel access procedure when it is determined according to the indication information not to enable the short control information transmission.

8. The network device according to claim 7, wherein grant information for scheduling the transmission of the first channel includes channel access parameter indication information when it is determined according to the indication information that the transmission of the first channel corresponds to the channel access procedure; or the grant information for scheduling the transmission of the first channel does not include the channel access parameter indication information when it is determined according to the indication information that the transmission of the first channel does not correspond to the channel access procedure;

wherein the channel access parameter indication information indicates a type of a channel access scheme.

9. The network device according to claim 7, wherein the channel access procedure is performed before the transmission of the first channel when it is determined according to the indication information that the transmission of the first channel corresponds to the channel access procedure; and/or no channel access procedure is performed before the transmission of the first channel when it is determined according to the indication information that the transmission of the first channel does not correspond to the channel access procedure.

10. The network device according to claim 7, wherein the first channel comprises at least one of:

a Physical Uplink Shared Channel (PUSCH) scheduled by a Downlink Control Information (DCI) format 0_1, a PUSCH scheduled by a DCI format 0_2, a Physical Uplink Control Channel (PUCCH) corresponding to a Physical Downlink Shared Channel (PDSCH) scheduled by a DCI format 1_1, a PUCCH corresponding to a PDSCH scheduled by a DCI format 1_2, a sidelink scheduled by a Sidelink Control Information (SCI) format, or a feedback link corresponding to a sidelink scheduled by an SCI format, a PUSCH scheduled by a Random Access Response (RAR) uplink grant, a PUSCH scheduled by a fallback Random Access Response (fallbackRAR) uplink grant, a PUCCH corresponding to a successful Random Access Response (successRAR), or a PUSCH scheduled by a DCI format 0_0;

wherein the first channel comprises a PUCCH corresponding to a PDSCH scheduled by a DCI format 1_0.

11. The network device according to claim 7, wherein the first channel comprises at least one of:

a Physical Random Access Channel (PRACH) or a message MsgA, the MsgA including a PRACH and a MsgA PUSCH.

\* \* \* \* \*